United States Patent
Saligrama et al.

(10) Patent No.: US 12,440,544 B2
(45) Date of Patent: Oct. 14, 2025

(54) CROSS-REACTIVE EPITOPE FOR MULTIPLE SCLEROSIS

(71) Applicant: The Board of Trustees of the Leland Stanford Junior University, Stanford, CA (US)

(72) Inventors: Naresha Saligrama, Stanford, CA (US); Mark M. Davis, Atherton, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 895 days.

(21) Appl. No.: 17/638,005

(22) PCT Filed: Sep. 3, 2020

(86) PCT No.: PCT/US2020/049242
§ 371 (c)(1),
(2) Date: Feb. 24, 2022

(87) PCT Pub. No.: WO2021/046244
PCT Pub. Date: Mar. 11, 2021

(65) Prior Publication Data
US 2022/0280620 A1    Sep. 8, 2022

Related U.S. Application Data

(60) Provisional application No. 62/895,805, filed on Sep. 4, 2019.

(51) Int. Cl.
| | | |
|---|---|---|
| *A61K 39/00* | (2006.01) |
| *A61P 25/28* | (2006.01) |
| *C07K 14/005* | (2006.01) |
| *C07K 14/725* | (2006.01) |
| *C07K 14/74* | (2006.01) |
| *C07K 16/28* | (2006.01) |
| *C07K 19/00* | (2006.01) |
| *G01N 33/50* | (2006.01) |
| *G01N 33/564* | (2006.01) |

(52) U.S. Cl.
CPC .......... *A61K 39/0008* (2013.01); *A61P 25/28* (2018.01); *C07K 14/005* (2013.01); *C07K 14/7051* (2013.01); *C07K 14/70539* (2013.01); *C07K 16/2833* (2013.01); *C07K 19/00* (2013.01); *G01N 33/505* (2013.01); *G01N 33/564* (2013.01); *G01N 2800/285* (2013.01)

(58) Field of Classification Search
CPC .............. A61K 39/0008; A61K 39/235; C07K 14/70539; C07K 14/005; A61P 25/28
See application file for complete search history.

(56) References Cited

U.S. PATENT DOCUMENTS

| | | |
|---|---|---|
| 9,340,577 B2 | 5/2016 | Grey et al. |
| 9,913,884 B2 | 3/2018 | Fikes et al. |
| 2008/0089900 A1 | 4/2008 | Strominger et al. |
| 2010/0331273 A1 | 12/2010 | Medina-Kauwe |
| 2017/0174764 A1 | 6/2017 | Cohen et al. |

FOREIGN PATENT DOCUMENTS

| | | |
|---|---|---|
| WO | WO2005023848 | 3/2005 |

OTHER PUBLICATIONS

Ott et al. (2018) "An Immunogenic Personal Neoantigen Vaccine for Melanoma Patients," Nature, vol. 547, Iss. 7662, pp. 217-221.
Hausmann et al.(1997) "Activation of autoreactive T cells by peptides from human pathogens." *Current opinion in immunology*, 9(6), 831-838.
Wucherpfennig et al. (1995) "Molecular mimicry in T cell-mediated autoimmunity: viral peptides activate human T cell clones specific for myelin basic protein." *Cell*, 80(5), 695-705.
Database EMBL (2016) "Bat mastadenovirus G isolate 250-A complete genome." XP002810166.

*Primary Examiner* — Barry A Chestnut
(74) *Attorney, Agent, or Firm* — Pamela J. Sherwood; Andrew R. Guzman; Bozicevic, Field & Francis LLP

(57) ABSTRACT

Provided herein are methods and compositions for diagnosis and treatment of multiple sclerosis. Compositions and methods are provided, relating to novel peptides involved in autoimmune disease. In the experiments described herein, an unbiased approach was used to screen pathogenic CD4+ T cells from patients with multiple sclerosis (MS), and to determine the antigenic specificity of the T cell receptors (TCR) expressed by these pathogenic cells.

20 Claims, 13 Drawing Sheets
Specification includes a Sequence Listing.

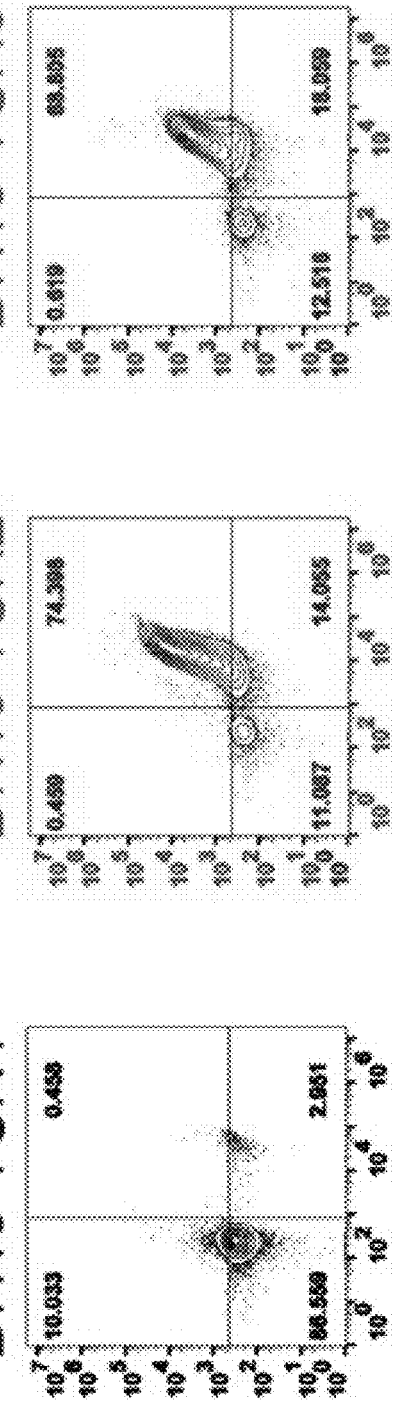

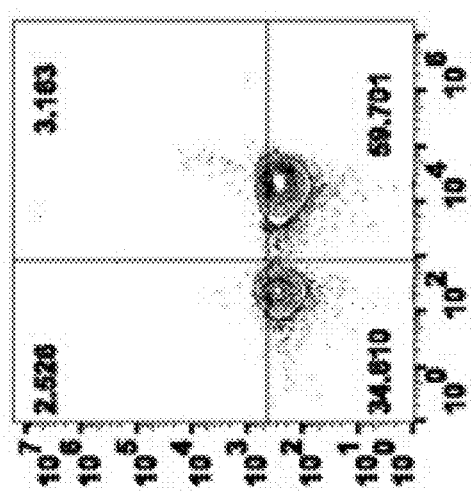
FIG. 1D MS-3 TCR
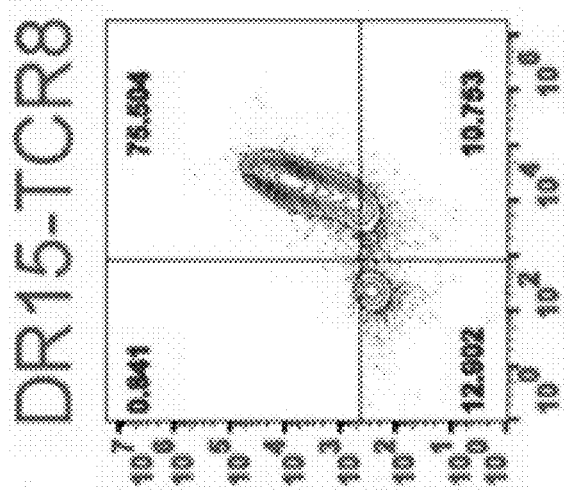
FIG. 1E MS-4 TCR
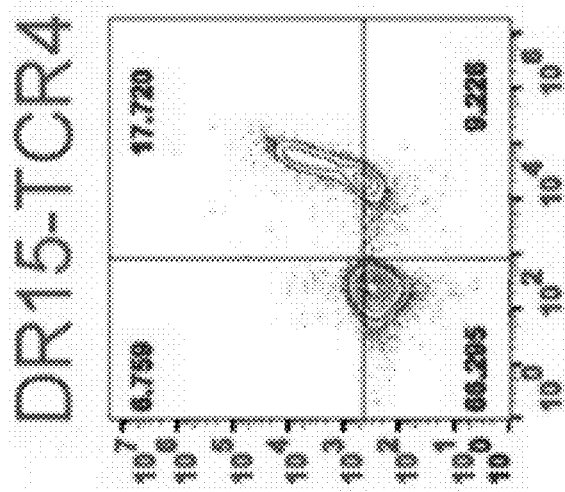
FIG. 1F

FIG. 1G

| | TRBV | TRBJ | CDR3b | TRAV | TRAJ | CDR3a | Patient ID |
|---|---|---|---|---|---|---|---|
| 1 | TRBV18 | TRBJ1-1 | CASSGTGNTEAFF | TRAV22 | TRAJ15 | CAENQAGTALIF | 700057 |
| 2 | TRBV14 | TRBJ2-7 | CASSHNSYEQYF | TRAV9-1 | TRAJ30 | CALTLQNRDKLIF | 700057 |
| 3 | TRBV4-3 | TRBJ1-5 | CASSQEAGNNQPQHF | TRAV21 | TRAJ8 | CAVSYTGFQKLVF | 700057 |
| 4 | TRBV18 | TRBJ1-2 | CASSEPNIGYTF | TRAV10 | TRAJ48 | CVVRRSNFGNEKLTF | 700057 |
| 5 | TRBV15 | TRBJ2-7 | CATSRPGGYEQYF | TRAV17 | TRAJ44 | CATDATGTASKLIF | 700057 |
| 6 | TRBV5-5 | TRBJ1-2 | CASSPGTPNYGYTF | TRAV30 | TRAJ37 | CGTASNTGKLIF | 700057 |
| 7 | TRBV12-3 | TRBJ2-2 | CASSYTGTSGNTGELFF | TRAV26-2 | TRAJ40 | CILRDTTSGTYKYIF | 700057 |
| 8 | TRBV7-6 | TRBJ1-5 | CASSLGGTYSNQPQHF | TRAV19 | TRAJ5 | CAISDPYTGRRAFTF | 700103 |
| 9 | TRBV7-9 | TRBJ1-1 | CASRRPQEGTEAFF | TRAV12-3 | TRAJ48 | CAIPGLTF | 700103 |

New substitution matrix based on TCR stimulation results

A Library Peptides

| | | | | | | | | | | |
|---|---|---|---|---|---|---|---|---|---|---|
| ARIQSYRSWYLK | A | R | I | Q | S | Y | R | S | W | Y | L | K |
| ATFTSYRSWYLT | A | T | F | T | S | Y | R | S | W | Y | L | T |
| ADLMHRSWYSK | A | D | L | M | H | R | S | W | Y | S | K |
| ARIQSYRSWYLT | A | R | I | Q | S | Y | R | S | W | Y | L | T |
| ATFTSYRSWYLK | A | T | F | T | S | Y | R | S | W | Y | L | K |
| ADLMHRSWYLT | A | D | L | M | H | R | S | W | Y | L | T |
| ATFTSYRSWYSK | A | T | F | T | S | Y | R | S | W | Y | S | K |
| ADLMHRSWYLK | A | D | L | M | H | R | S | W | Y | L | K |
| ARIQSYRSWYSK | A | R | I | Q | S | Y | R | S | W | Y | S | K |

B Predicted Self Peptides

| | | | | | | | | | | |
|---|---|---|---|---|---|---|---|---|---|---|
| ANYGKARSWYLK |
| ARDTSESSSFLK |
| AFQDSYRMLTLK |
| IDRHMYHSLYLK |
| AELQSLEQSHLK |
| ADLQDTASLTLK |
| AKLQDFHQWYLA |
| ARIQMRRWQBLT |
| ADITDGMSEHLK |
| DKGQQYRNWFLK |
| AMTTQARSSVLA |
| RRPQRHRSWHLA |
| ATIAERRMLVLK |
| AEMTSKHQEYLK |
| HLIDQYDSLYSK |
| LIIKSYRKYHSK |
| GFFQFYDTEYLK |
| CRLMSFWTWWLK |
| ARGTTTRRSBLK |
| AAGGKYRSTVSK |
| SCIRSYSSIVLK |
| PMPREVESWYLK |
| PLVTDEDSWYSK |

FIGURE 4

Adenovirus specific CD4 T cells from MS patients cross-react with myelin

FIGURE 7

| | | TCRb | | | TCRa |
|---|---|---|---|---|---|
| Ob1A12 | TRBV20-1 TRBJ2-1 | CSARDLTSGANNEQF | TRAV17-1 TRAJ40 | CATDTTSGTYKYIF |
| DR15 TCR2 (MS1) | TRBV14 TRBJ2-7 | CASSHNSYEQYF | TRAV9-1 TRAJ30 | CALTLQNFDDKILF |
| | | | | | |
| DR15-Adeno TCR2 | TRBV11-1 TRBJ1-2 | CASSPRQEYGYTF | TRAV13-2 TRAJ7 | CAEKAYGNNRLAF |
| DR15-Adeno TCR9 | TRBV3-1 TRBJ2-5 | CASTGSYREVGVAAETQYF | TRAV12-1 TRAJ4 | CVVLPGYNKLIF |

| | |
|---|---|
| MBP | ENPVVHFFKNIVTPR |
| Adeno peptide | ATFTSYRSWYLA |
| | |
| Self peptide-1 | ANYGKARSWYLK |
| Self peptide-4 | IDRHMYHSLYLK |
| Self peptide-10 | DKGQQYRNWFLK |

FIGURE 9

CROSS-REACTIVE EPITOPE FOR MULTIPLE SCLEROSIS

CROSS REFERENCE

This application claims the benefit of U.S. Provisional Patent Application No. 62/895,805, filed Sep. 4, 2019, which application is incorporated herein by reference in its entirety.

BACKGROUND

There is a long-standing interest in manipulating cells of the immune system to achieve control of autoimmune and other inflammatory diseases. Conventional methods of treatment have generally been non-antigen-specific. For example, general immunosuppression utilizes agents such as methylprednisolone, other steroids, methotrexate, cladribine, cyclophosphamide. However the overall immunosuppression that these therapies provide has considerable undesirable side effects.

More selective modification of the immune system utilizes agents such as cytokine blocking agents, e.g. anti-TNFα antibodies, soluble TNFα receptor, soluble IL-1 receptor (Anakinra), and anti-IL-6R antibodies (Tocilizumab); T cell targeted therapies (CTLA4-Ig [Abatacept]), B cell targeted therapies (anti-CD20 [Rituximab]), and the like. Alternatively, anti-inflammatory cytokines also find use, such as interferon beta (IFNβ)-1b (Betaferon/Betaseron). But although these therapies are more targeted, there is still immune suppression of a whole class of responses, not specifically the undesirable response.

The promise of highly selective, antigen-specific therapies thus remains alluring, although elusive. Such specificity could potentially provide for effective treatment of undesirable immune responses without comprising whole immune system populations or responses. Identification of initiating antigens is of clinical interest for this and for diagnostic purposes, and is addressed herein.

SUMMARY

Compositions and methods are provided, relating to novel peptides involved in autoimmune disease. In the experiments described herein, an unbiased approach was used to screen pathogenic CD$^{4+}$ T cells from patients with multiple sclerosis (MS), and to determine the antigenic specificity of the T cell receptors (TCR) expressed by these pathogenic cells. By this method, it was surprisingly found that a peptide epitope present in human adenovirus was able to activate MS pathogenic T cells in an MHC-relevant context, and that the TCRs activated by this peptide were in some instances also reactive with a myelin basic protein (MBP) epitope believed to be a target for MS autoimmune responses. The adenovirus amino acid sequence and the MBP amino acid sequence were not similar, and the cross-reactivity was unlikely to be found in conventional screening methods. The adenovirus and related peptides may be referred to herein as "cross-reactive" peptides.

While not being bound by the theory, it may be envisioned that in certain MHC contexts, including without limitation human DR15 proteins, an initial T cell response to a virus protein may initiate a response that spills over to an autoantigen that, while lacking overt sequence similarity, shares activation of the same TCR.

Knowledge of initiating autoantigens can be used to develop specific therapies and diagnostics for MS, in place of the non-specific immunomodulation that is conventionally used. The present invention provides an important candidate antigen for being involved in initiation in the development of MS; and provides a target for diagnosis and therapeutic intervention.

Compositions are provided of cross-reactive peptides for multiple sclerosis. In some embodiments the cross-reactive peptide comprises or consists of an amino acid sequence (SEQ ID NO:1) ATFTSYRSWYLA, or a variant thereof, e.g. a peptide altered by the deletion or substitution of 1, 2, 3 or more amino acids. In other embodiments the peptide comprises or consists of an amino acid sequence (SEQ ID NO:2) ANYGKARSWYLK, (SEQ ID NO:3) IDRHMYHSYLK, (SEQ ID NO:4) DKGQQYRNWFLK, or a variant thereof, e.g. a peptide altered by the deletion or substitution of 1, 2, 3 or more amino acids. In some embodiments the cross-reactive peptide comprises or consists of a peptide sequence set forth in FIG. 2 or FIG. 4, SEQ ID NO:23-75, or a variant thereof, e.g. a peptide altered by the deletion or substitution of 1, 2, 3 or more amino acids. In certain embodiments, a variant peptide retains binding specificity and/or affinity to the same TCR as the amino acid sequence of the peptide from which it is a variant, i.e. SEQ ID NO:1; 2; 3; 4; etc. In other embodiments a variant peptide retains the T cell receptor specificity of the peptide from which it is a variant, i.e. SEQ ID NO:1; 2; 3; 4; etc., but the affinity is altered.

T cell responses to cross-reactive peptide(s) may serve as a diagnostic marker in MS. A variety of methods may be utilized for the detection of augmented T cell responses, such as screening for activation markers on cross-reactive peptide(s)-specific T cells in body fluids, including cerebrospinal fluid, examining frequencies of specific T cells, or enhanced production of cytokines in response to cross-reactive peptide(s). Increased immune responses against cross-reactive peptide(s), either humoral or cellular, may be specifically associated with MS and employed to assist diagnosis.

Antibodies may be raised to the cross-reactive peptide(s); to a complex of the cross-reactive peptide(s) and a human MHC protein, including without limitation DR15 protein; or to a TCR responsive to the cross-reactive peptide(s), as described herein, for example the TCR sequences shown in FIG. 1G, SEQ ID NO:5-22 or FIG. 9 SEQ ID NO:76-83. Such antibodies may be therapeutic in blocking the activation of pathogenic T cells.

Cross-reactive peptides also find use in tolerization strategies, e.g. to decrease pathogenic responses through altered peptide ligands (APLs), manipulation of dendritic cell responses, biasing T cell responses to non-pathogenic responses, and the like.

BRIEF DESCRIPTION OF THE DRAWINGS

The invention is best understood from the following detailed description when read in conjunction with the accompanying drawings. On the contrary, the dimensions of the various features are arbitrarily expanded or reduced for clarity. Included in the drawings are the following figures.

FIGS. 1A-1G. 18 newly diagnosed MS patients PBMCs and 4 healthy controls (HC) PBMC were analyzed. Initially CyToF was performed to determine if there is a difference in the T cell population among HC and MS. It was found that MS patients had higher frequency of brain homing activated T cells, which we single cell sorted and performed paired TCR sequencing and found that −1. MS CD8 T cells were massively expanded, 2. MS CD4 T cells, there was minimal expansion, 3. γδ T cells were expanded at the same level as HC. We focused on the CD4 TCR specificity as MS is highly associated with DR150101 (20-30% susceptibility). To identify antigen specificity, we clustered CD4 TCRs with GLIPH. With GLIPH, we were able to identify CD4 TCR clusters which were enriched among DR150101 MS individuals. As shown above, we picked 9 CD4 TCRs which were clustered with DR15 for antigen discovery. We generated these 9 CD4 TCRs as soluble recombinant proteins and screened 12 MER and 15 MER DR15-yeast library. (B-E) As shown above, with screening, among 9 CD4 TCRs, we find enrichment (A647-Myc) and tetramer (PE-TCR Tet) staining for 4 CD4 TCRs (MS-1-MS-4 TCR). (A and F) For some of the TCRs we did not find enrichment of peptides (DR15-TCR1 and DR15-TCR9). (G) Table listing the CD4 TCR sequences that were screened on DR15 yeast library, SEQ ID NO:5-22.

FIG. 4. Using the single point mutation on the yeast library peptides (A), an improved substitution matrix was generated. With the new substitution matrix (B), candidate self-peptides were predicted, and these new predicted peptides, SEQ ID NO:53-75 were used for MS-1 TCR stimulation.

FIG. 7. TCR cell lines from adeno-tetramer sorted CD4 TCRs were tested for cross reactivity with MBP 85-99 peptide. We also tested MS-1 TCR for cross reactivity with MBP. Adeno specific TCRs were stimulated with Adeno peptide and MBP. (A) TCR2/ms-1 TCR and some of the (B) adeno-TCRs (Adeno-TCR1 and 9) cross react with MBP peptide.

FIG. 9. TCRαβ sequences for DR15 TCR2/MS-1 TCR, DR15-Adeno TCR2, SEQ ID NO:76-83, and Adeno TCR9 and also peptide sequences for MBP, Adeno, and 3 self-peptides, SEQ ID NO:84, 1-4.

DETAILED DESCRIPTION OF THE EMBODIMENTS

Figure 2:
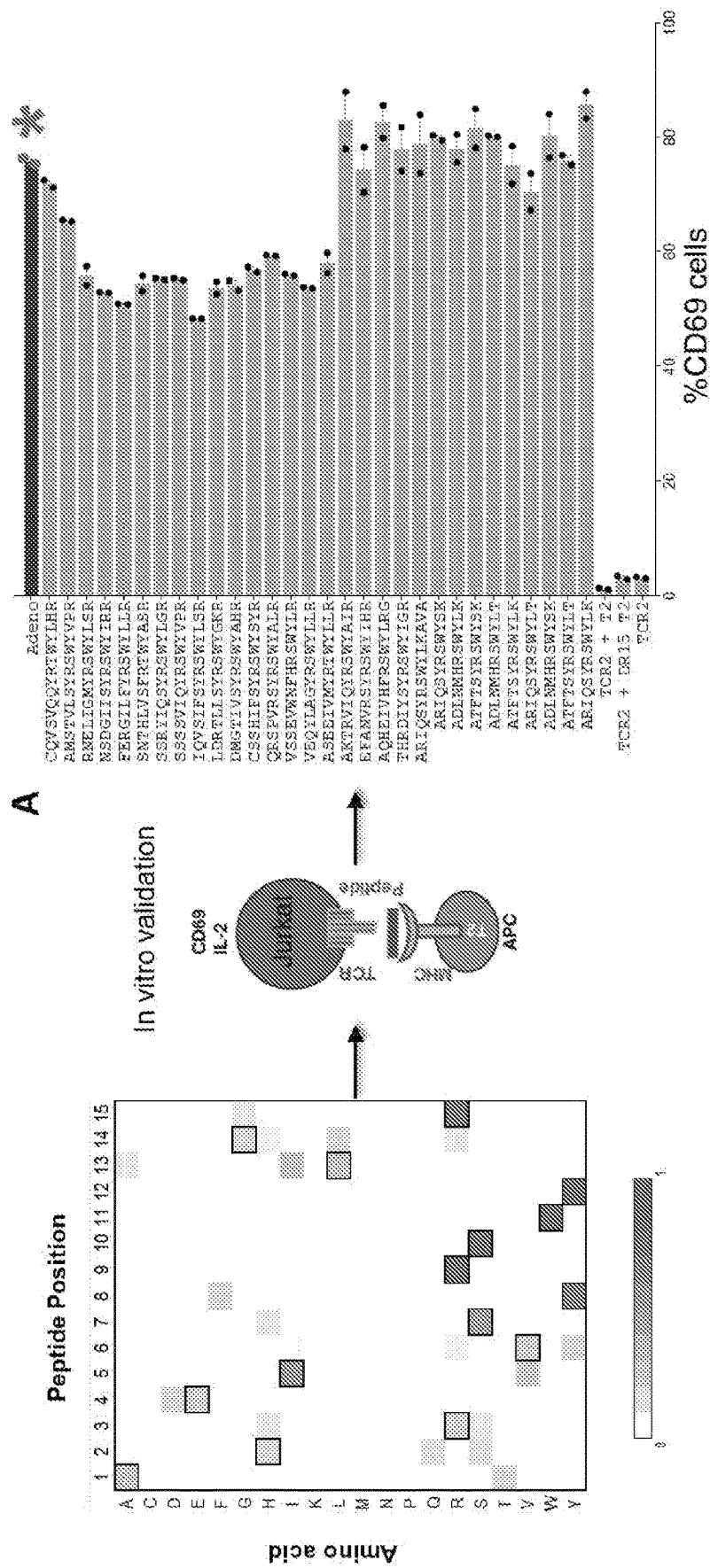
FIG. 2. We generated MS1-TCR cell line, co-cultured with T2-DR15 antigen presenting cell line loaded with yeast library generated peptides and were examined for activation. CD69 was used as a marker for T cell activation. (A) As shown above most of the library, SEQ ID NO:23-52, enriched peptides stimulated MS-1 TCR cell line. We used yeast library enrichment data to predict actual peptides/antigens (self or non-self) for MS-1 CD4 TCRs. Surprisingly, we found an adenovirus peptide (Adeno—ATFTSYR-SWYLA, SEQ ID NO:1) to be almost identical to enriched peptides, it also stimulated MS-1 TCR cell line.
Figure 3:
FIG. 3. In addition to yeast library peptide enrichment, an additional layer was added that helps the algorithm to determine the wild type peptide. Essentially, single point mutations were made on the top most enriched library peptide, and used these positional mutant peptide T cell stimulation data used to better generate a substitution matrix, which in turn was used for algorithm to search for actual peptides from the human proteome. T cell receptor 2, TCR2; T2 lymphoblast cell line expressing DR15, DR15 T2; Myelin basic protein, MBP; Adeno peptide, Adeno; Library peptide, Lib-PP; Altered library peptide ALIBPP. With this positional mutation/refined substitution matrix data, we were able to identify 3 self-peptides for TCR2/MS-1 TCR.
Figure 5:
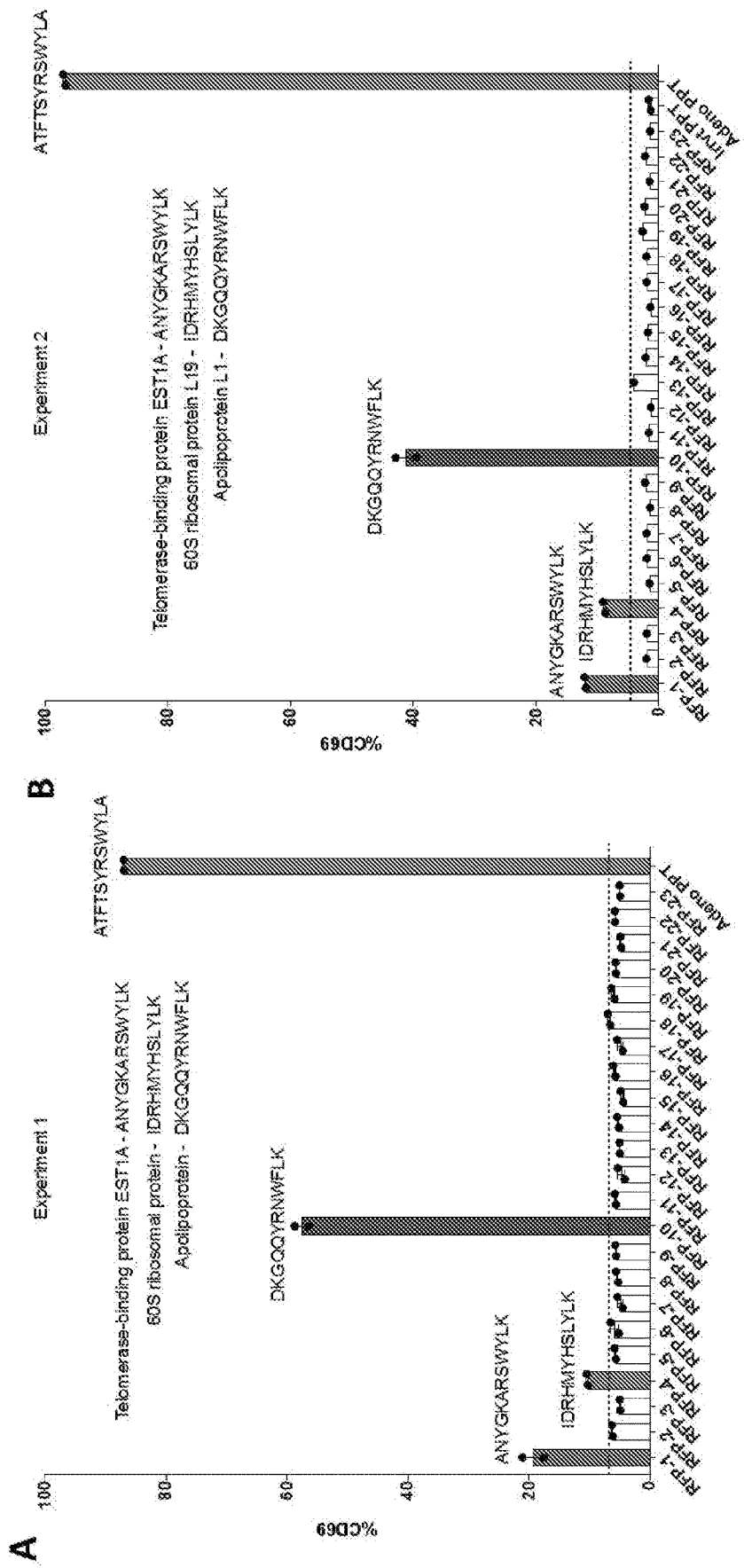
FIG. 5. With positional mutation/refined substitution matrix data, 3 self-peptides, SEQ ID NO:2, 3 and 4, were identified for TCR2/MS-1 TCR, shown in (A and B).
Figure 6:
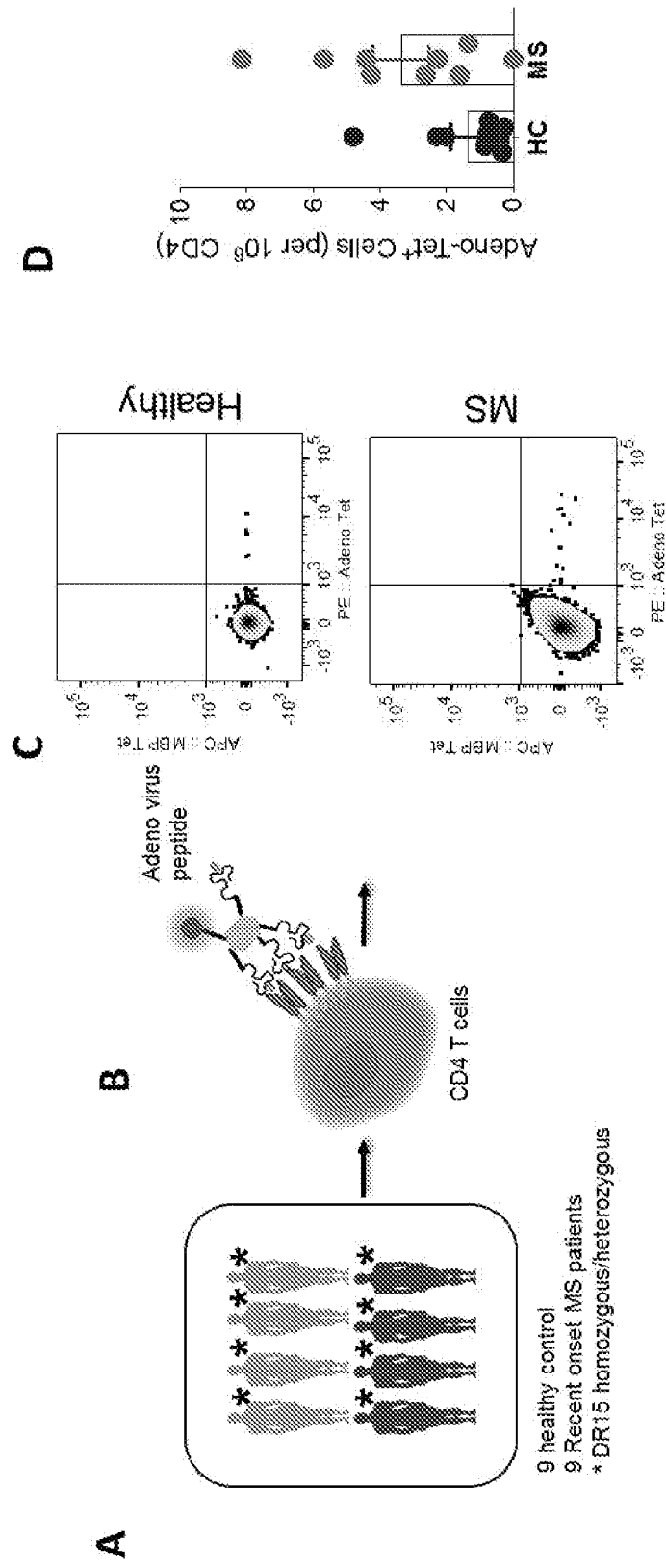
FIG. 6. To detect/determine adeno specific T cells directly from MS patients (n=9) and healthy (n=9) (A), we generated pMHC tetramers (B), enriched, and enumerated CD4's that are specific to the adeno peptide. (C) We were able to detect adeno specific CD4 T cells, which were higher in number among MS patients compared to HC (D). We also single cell sorted these adeno specific CD4 T cells, sequenced their TCRs, and generated TCR cell lines (adeno specific TCRs).
Figure 8:
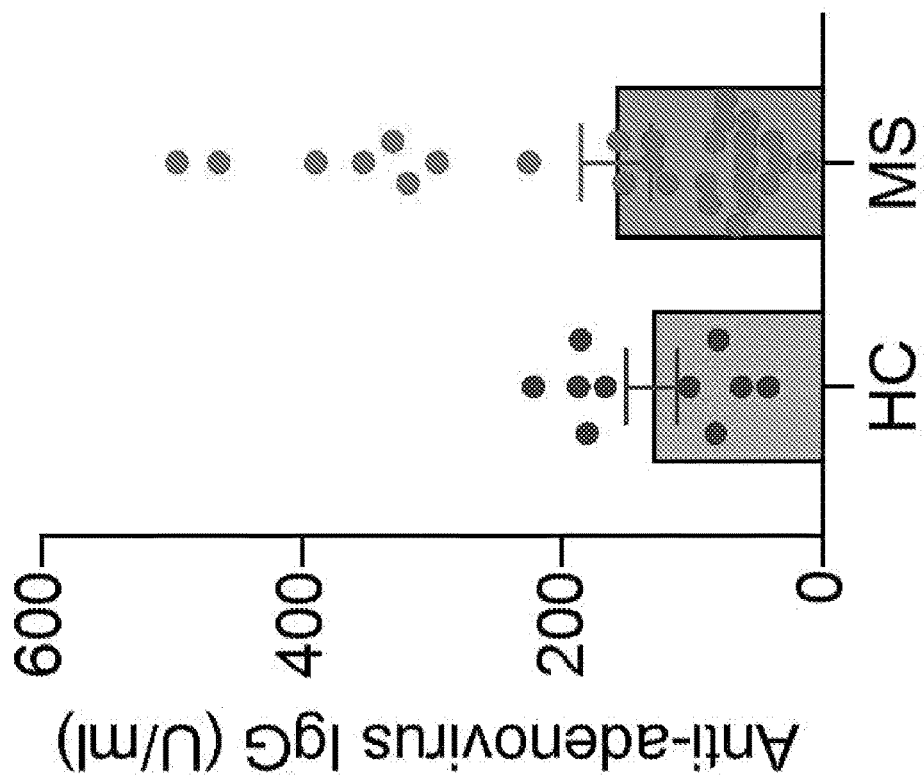
FIG. 8. Serum from MS (n=28) and HC (n=10) was tested for adeno virus titers in the serum. A subset of MS sera had higher adeno virus compared to HC sera.
Figure 10:
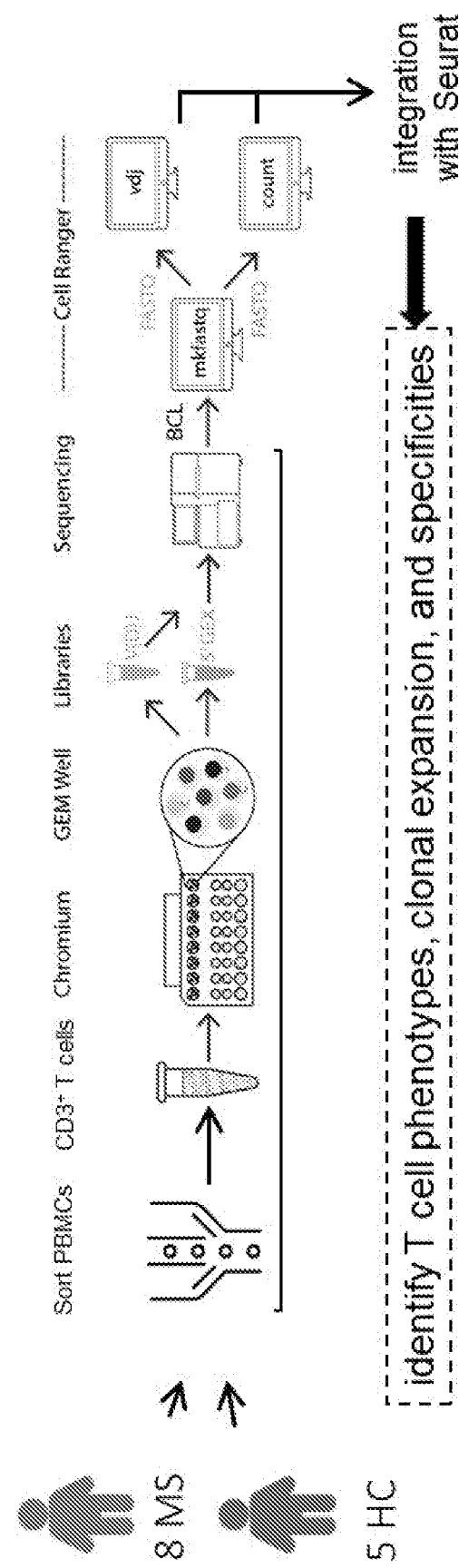
FIG. 10. CD3+ T cells from 8 MS and 5 HCs were sorted, and TCR and RNA-seq performed using 10× platform. Additionally, for 4 out of 8 MS patients, T cells from cerebrospinal fluid were sequenced.
Figure 11:
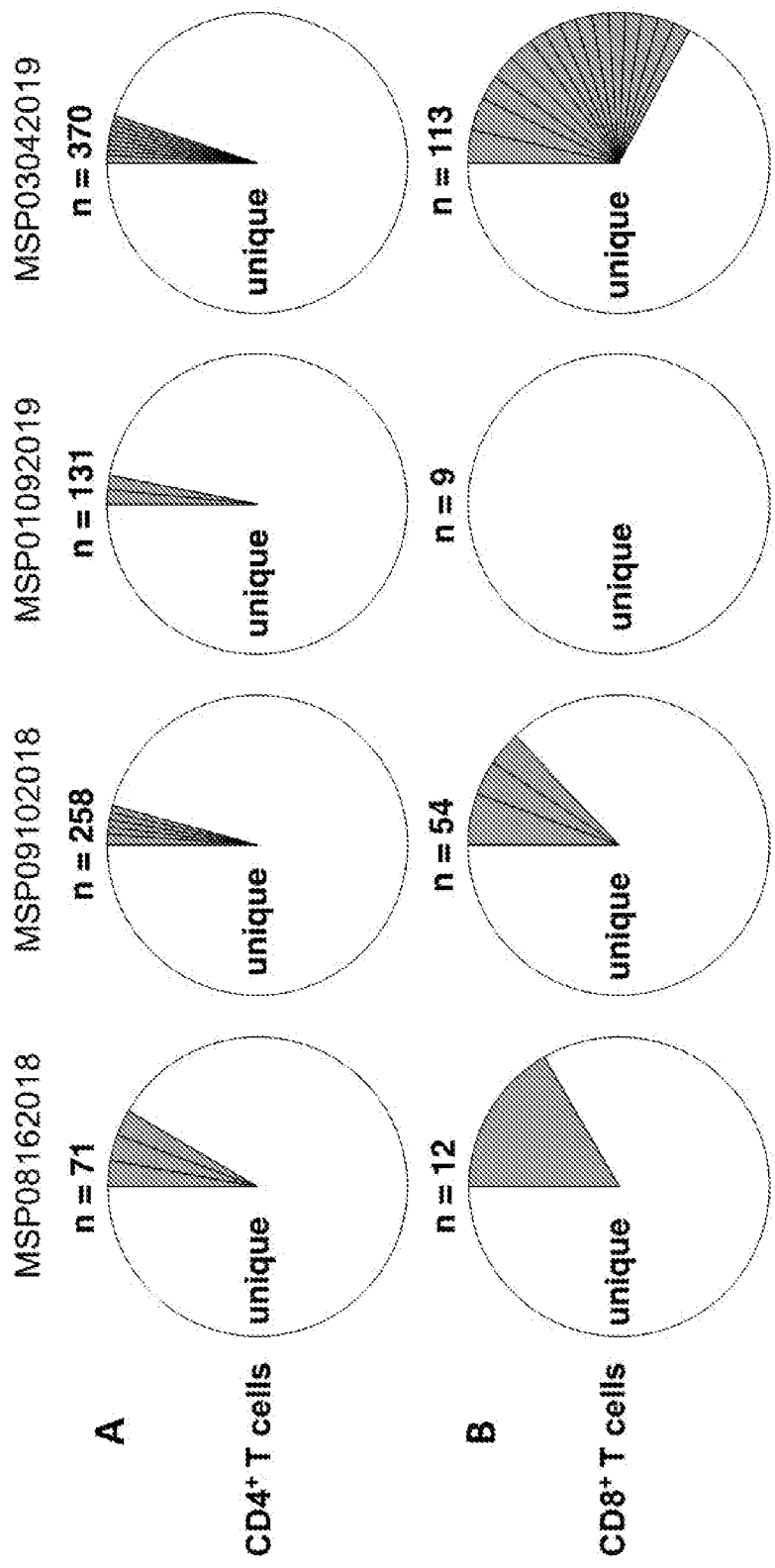
FIG. 11. T cells from cerebrospinal fluid were sequenced in 4 out of 8 MS patients. Clonal expansion was found among (A) CD4+ and (B) CD8+ T cells within CSF of each MS patient.

Before the present methods are described, it is to be understood that this invention is not limited to particular methods described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges, subject to any specifically excluded limit in the stated range. As used herein and in the appended claims, the singular forms "a", "and", and "the" include plural referents unless the context clearly dictates otherwise.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

General methods in molecular and cellular biochemistry can be found in such standard textbooks as Molecular Cloning: A Laboratory Manual, 3rd Ed. (Sambrook et al., Harbor Laboratory Press 2001); Short Protocols in Molecular Biology, 4th Ed. (Ausubel et al. eds., John Wiley & Sons 1999); Protein Methods (Bollag et al., John Wiley & Sons 1996); Nonviral Vectors for Gene Therapy (Wagner et al. eds., Academic Press 1999); Viral Vectors (Kaplift & Loewy eds., Academic Press 1995); Immunology Methods Manual (I. Lefkovits ed., Academic Press 1997); and Cell and Tissue Culture: Laboratory Procedures in Biotechnology (Doyle & Griffiths, John Wiley & Sons 1998). Reagents, cloning vectors, and kits for genetic manipulation referred to in this disclosure are available from commercial vendors such as BioRad, Stratagene, Invitrogen, Sigma-Aldrich, and ClonTech.

The present inventions have been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

Compositions and methods are provided that relate to the characterization, use, and manipulation of immunogenic peptides associated with autoimmune disease.

The subject methods may be used for diagnostic, prophylactic or therapeutic purposes. As used herein, the term "treating" is used to refer to both prevention of relapses, and treatment of pre-existing conditions. For example, the prevention of autoimmune disease may be accomplished by administration of the agent prior to development of a relapse. "Treatment" as used herein covers any treatment of a disease in a mammal, particularly a human, and includes: (a) preventing the disease or symptom from occurring in a subject which may be predisposed to the disease or symptom but has not yet been diagnosed as having it; (b) inhibiting the disease symptom, i.e., arresting its development; or (c) reducing the symptoms of the disease, i.e., causing regression of the disease or symptom. The treatment of ongoing disease, where the treatment stabilizes or improves the clinical symptoms of the patient, is of particular interest.

"Inhibiting" the onset of a disorder shall mean either lessening the likelihood of the disorder's onset, or preventing the onset of the disorder entirely. Reducing the severity of a relapse shall mean that the clinical indicia associated with a relapse are less severe in the presence of the therapy than in an untreated disease. As used herein, onset may refer to a relapse in a patient that has ongoing relapsing remitting disease. The methods of the invention can be specifically applied to patients that have been diagnosed with inflammatory disease, including for example autoimmune disease. Treatment may be aimed at the treatment or reducing severity of relapses, which are an exacerbation of a pre-existing condition.

"Diagnosis" as used herein generally includes determination of a subject's susceptibility to a disease or disorder, determination as to whether a subject is presently affected by a disease or disorder, prognosis of a subject affected by a disease or disorder (e.g., identification of disease states, stages of disease, or responsiveness of disease to therapy), and use of therametrics (e.g., monitoring a subject's condition to provide information as to the effect or efficacy of therapy).

The term "biological sample" encompasses a variety of sample types obtained from an organism and can be used in a diagnostic or monitoring assay. The term encompasses blood, cerebral spinal fluid, and other liquid samples of biological origin, solid tissue samples, such as a biopsy specimen or tissue cultures or cells derived therefrom and the progeny thereof. The term encompasses samples that have been manipulated in any way after their procurement, such as by treatment with reagents, solubilization, or enrichment for certain components. The term encompasses a clinical sample, and also includes cells in cell culture, cell supernatants, cell lysates, serum, plasma, biological fluids, and tissue samples.

The terms "individual," "subject," "host," and "patient," used interchangeably herein and refer to any mammalian subject for whom diagnosis, treatment, or therapy is desired, for example humans, non-human primate, mouse, rat, guinea pig, rabbit, etc.

The term "agent" as used herein includes any substance, molecule, element, compound, entity, or a combination thereof. It includes, but is not limited to, e.g., protein, oligopeptide, small organic molecule, polysaccharide, polynucleotide, and the like. It can be a natural product, a synthetic compound, or a chemical compound, or a combination of two or more substances. Unless otherwise specified, the terms "agent", "substance", and "compound" can be used interchangeably.

"Suitable conditions" shall have a meaning dependent on the context in which this term is used. That is, when used in connection with an antibody, the term shall mean conditions that permit an antibody to bind to its corresponding antigen. When used in connection with contacting an agent to a cell, this term shall mean conditions that permit an agent capable of doing so to enter a cell and perform its intended function. In one embodiment, the term "suitable conditions" as used herein means physiological conditions.

A "subject" or "patient" in the context of the present teachings is generally a mammal. Mammals other than humans can be advantageously used as subjects that represent animal models of inflammation. A subject can be male or female.

To "analyze" includes determining a set of values associated with a sample by measurement of a marker (such as, e.g., presence or absence of a marker or constituent expression levels) in the sample and comparing the measurement against measurement in a sample or set of samples from the same subject or other control subject(s). In particular the cell surface markers of the present teachings can be analyzed by any of various conventional methods known in the art. To "analyze" can include performing a statistical analysis to, e.g., determine whether a subject is a responder or a non-responder to a therapy (e.g., administration of a peptide treatment as described herein).

A "pharmaceutically acceptable excipient," "pharmaceutically acceptable diluent," "pharmaceutically acceptable carrier," and "pharmaceutically acceptable adjuvant" means an excipient, diluent, carrier, and adjuvant that are useful in preparing a pharmaceutical composition that are generally safe, non-toxic and neither biologically nor otherwise undesirable, and include an excipient, diluent, carrier, and adjuvant that are acceptable for veterinary use as well as human pharmaceutical use. "A pharmaceutically acceptable excipient, diluent, carrier and adjuvant" as used in the specification and claims includes both one and more than one such excipient, diluent, carrier, and adjuvant.

As used herein, a "pharmaceutical composition" is meant to encompass a composition suitable for administration to a subject, such as a mammal, especially a human. In general a "pharmaceutical composition" is sterile, and preferably free of contaminants that are capable of eliciting an undesirable response within the subject (e.g., the compound(s) in the pharmaceutical composition is pharmaceutical grade). Pharmaceutical compositions can be designed for administration to subjects or patients in need thereof via a number of different routes of administration including oral, buccal, rectal, parenteral, intraperitoneal, intradermal, intracheal, intramuscular, subcutaneous, and the like.

"Dosage unit" refers to physically discrete units suited as unitary dosages for the particular individual to be treated. Each unit can contain a predetermined quantity of active compound(s) calculated to produce the desired therapeutic effect(s) in association with the required pharmaceutical carrier. The specification for the dosage unit forms can be dictated by (a) the unique characteristics of the active compound(s) and the particular therapeutic effect(s) to be achieved, and (b) the limitations inherent in the art of compounding such active compound(s).

"Pharmaceutically acceptable excipient" means an excipient that is useful in preparing a pharmaceutical composition that is generally safe, non-toxic, and desirable, and includes excipients that are acceptable for veterinary use as well as for human pharmaceutical use. Such excipients can be solid, liquid, semisolid, or, in the case of an aerosol composition, gaseous.

"Pharmaceutically acceptable salts and esters" means salts and esters that are pharmaceutically acceptable and have the desired pharmacological properties. Such salts include salts that can be formed where acidic protons present in the compounds are capable of reacting with inorganic or organic bases. Suitable inorganic salts include those formed with the alkali metals, e.g. sodium and potassium, magnesium, calcium, and aluminum. Suitable organic salts include those formed with organic bases such as the amine bases, e.g., ethanolamine, diethanolamine, triethanolamine, tromethamine, N methylglucamine, and the like. Such salts also include acid addition salts formed with inorganic acids (e.g., hydrochloric and hydrobromic acids) and organic acids (e.g., acetic acid, citric acid, maleic acid, and the alkane- and arene-sulfonic acids such as methanesulfonic acid and benzenesulfonic acid). Pharmaceutically acceptable esters include esters formed from carboxy, sulfonyloxy, and phosphonoxy groups present in the compounds, e.g., $C_{1-6}$ alkyl esters. When there are two acidic groups present, a pharmaceutically acceptable salt or ester can be a mono-acid-mono-salt or ester or a di-salt or ester; and similarly where there are more than two acidic groups present, some or all of such groups can be salified or esterified. Compounds named in this invention can be present in unsalified or unesterified form, or in salified and/or esterified form, and the naming of such compounds is intended to include both the original (unsalified and unesterified) compound and its pharmaceutically acceptable salts and esters. Also, certain compounds named in this invention may be present in more than one stereoisomeric form, and the naming of such compounds is intended to include all single stereoisomers and all mixtures (whether racemic or otherwise) of such stereoisomers.

The terms "pharmaceutically acceptable", "physiologically tolerable" and grammatical variations thereof, as they refer to compositions, carriers, diluents and reagents, are used interchangeably and represent that the materials are capable of administration to or upon a human without the production of undesirable physiological effects to a degree that would prohibit administration of the composition.

A "therapeutically effective amount" means the amount that, when administered to a subject for treating a disease, is sufficient to effect treatment for that disease.

As used herein, the term "in combination" refers to the use of more than one prophylactic and/or therapeutic agents. The use of the term "in combination" does not restrict the order in which prophylactic and/or therapeutic agents are administered to a subject with a disorder. A first prophylactic or therapeutic agent can be administered prior to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks 6 weeks, 8 weeks, or 12 weeks before), concomitantly with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of a second prophylactic or therapeutic agent to a subject with a disorder.

Immune tolerance, or immunological tolerance, or immunotolerance, is a state of unresponsiveness of the immune system to substances or tissue that have the capacity to elicit an immune response in a given organism. A tolerogenic regimen or formulation is a regimen or formulation that induces tolerance to an antigen of interest, e.g. tolerance to autoantigens such as myelin basic protein. A tolerogenic dose is the dose of an agent, e.g. peptide, altered peptide ligand, DNA vector, etc. that is sufficient to decrease undesirable immune responsiveness to a target antigen. A tolerogenic DNA construct is a DNA construct that encodes a tolerogenic peptide(s) that decreases undesirable immune responsiveness to a target antigen. A tolerogenic peptide is a peptide that acts to decrease undesirable immune responsiveness to a target antigen.

Tolerance can be induced through an immunization protocol developed to activate suppressive immune responses against an antigen. Tolerance is classified into central tolerance or peripheral tolerance depending on where the state is originally induced—in the thymus and bone marrow (central) or in other tissues and lymph nodes (peripheral).

Immune tolerance encompasses the range of physiological mechanisms by which the body reduces or eliminates an immune response to particular agents. It is used to describe the phenomenon underlying discrimination of self from non-self, suppressing allergic responses, allowing chronic infection instead of rejection and elimination, and preventing attack of fetuses by the maternal immune system.

Peripheral tolerance develops after T and B cells mature and enter the peripheral tissues and lymph nodes. It is established by a number of partly overlapping mechanisms that mostly involve control at the level of T cells, especially CD4+ helper T cells, which orchestrate immune responses Reactivity toward certain antigens may be reduced by induction of tolerance after repeated exposure, or exposure in a certain context. In these cases, there can be a differentiation of naïve CD4+ helper T cells into induced Treg cells (iTreg cells) in the peripheral tissue or nearby lymphoid tissue (lymph nodes, mucosal-associated lymphoid tissue, etc.).

Other regulatory immune cells include T cell subsets similar to but phenotypically distinct from Treg cells, including TR1 cells that make IL-10 but do not express Foxp3, TGF-β-secreting TH3 cells, as well as other less well-characterized cells that help establish a local tolerogenic environment.

Disease Conditions

In some embodiments the methods of the invention comprise treating, isolating cell populations from, or diagnosing individuals "at-risk" for development of, or in the "early-stages" of, an inflammatory disease. "At risk" for development of an inflammatory disease includes: (1) individuals whom are at increased risk for development of an inflammatory disease, and (2) individuals exhibiting a "pre-clinical" disease state, but do not meet the diagnostic criteria for the inflammatory disease (and thus are not formally considered to have the inflammatory disease).

Individuals "at increased risk" for development (also termed "at-risk" for development) of an inflammatory disease are individuals with a higher likelihood of developing an inflammatory disease or disease associated with inflammation compared to the general population. Such individuals can be identified based on their exhibiting or possessing one or more of the following: a family history of inflammatory disease; the presence of certain genetic variants (genes) or combinations of genetic variants which predispose the individual to such an inflammatory disease; the presence of physical findings, laboratory test results, imaging findings, marker test results (also termed "biomarker" test results) associated with development of the inflammatory disease, or marker test results associated with development of a metabolic disease; the presence of clinical signs related to the inflammatory disease; the presence of certain symptoms related to the inflammatory disease (although the individual is frequently asymptomatic); the presence of markers (also termed "biomarkers") of inflammation; and other findings that indicate an individual has an increased likelihood over the course of their lifetime to develop an inflammatory disease or disease associated with inflammation. Most individuals at increased risk for development of an inflammatory disease or disease associated with inflammation are asymptomatic, and are not experiencing any symptoms related to the disease that they are at an increased risk for developing.

Included, without limitation, in the group of individuals at increased risk of developing an inflammatory disease or a disease associated with inflammation, are individuals exhibiting "a pre-clinical disease state". The pre-disease state may be diagnosed based on developing symptoms, physical findings, laboratory test results, imaging results, and other findings that result in the individual meeting the diagnostic criteria for the inflammatory disease, and thus being formally diagnosed. Individuals with "pre-clinical disease" exhibit findings that suggest that the individual is in the process of developing the inflammatory disease, but do not exhibit findings, including the symptoms, clinical findings, laboratory findings, and/or imaging findings, etc. that are necessary to meet the diagnostic criteria for a formal diagnosis of the inflammatory disease. In some embodiments, individuals exhibiting a pre-clinical disease state possess a genetic variant or a combination of genetic variants that place them at increased risk for development of disease as compared to individuals who do not possess that genetic variant or that combination of genetic variants. In some embodiments, these individuals have laboratory results, or physical findings, or symptoms, or imaging findings that place them at increased risk for development of an inflammatory disease. In some embodiments, individuals with preclinical disease states are asymptomatic. In some embodiments, individuals with pre-clinical disease states exhibit increased or decreased levels of the expression of certain genes, certain proteins, inflammatory markers, metabolic markers, and other markers.

In certain embodiments, this invention is directed to the treatment of individuals with established inflammatory disease or disease associated with inflammation. The inflammatory disease can be diagnosed based on an individual that exhibits symptoms, signs, clinical features, laboratory test results, imaging test results, biomarker results, and other findings that enable a physician to formally diagnose that individual with the inflammatory disease, which findings can include the detection of CD4+ T cells activated by a cross-reactive antigenic peptide as disclosed herein.

In some embodiments, established inflammatory disease is an inflammatory disease for which an individual has had a formal diagnosis of the disease made by a physician for longer than 6 months. In established inflammatory disease, the signs or symptoms of disease may be more severe as compared to, for example, the symptoms for an individual diagnosed with early-stage inflammatory disease. In established inflammatory disease, the disease process may cause tissue or organ damage. As described herein, in certain embodiments, determination of inflammation in an individual with established disease can comprise analyzing the individual for the presence of at least one marker indicative of the presence of inflammation.

An inflammatory disease is considered a disease which exhibits clinical manifestations (abnormal clinical markers) such as visible inflammation including pain, swelling, warmth, and redness, and with respect to the present invention, will involve as a causative agent antigen-specific pathologic CD4+ T cells. Inflammatory diseases include without limitation autoimmune diseases, and may further include diseases with a specific T cell mediated component.

Inflammatory demyelinating diseases of the central nervous system are of particular interest and include, without limitation, multiple sclerosis (MS), neuromyelitis optica (NO), and experimental acquired encephalitis (EAE). Demyelinating diseases may be initiated by peptides of myelin associated proteins, e.g. MOG, MBP, MAG, etc. Demyelinating inflammatory diseases of the peripheral nervous system include Guillain-Barre syndrome (GBS) with its subtypes acute inflammatory demyelinating polyradiculoneuropathy, acute motor axonal neuropathy, acute motor and sensory axonal neuropathy, Miller Fisher syndrome, and acute pandysautonomia; chronic inflammatory demyelinating polyneuropathy (CIDP) with its subtypes classical CIDP, CIDP with diabetes, CIDP/monoclonal gammopathy of undetermined significance (MGUS), sensory CIDP, multifocal motor neuropathy (MMN), multifocal acquired demyelinating sensory and motor neuropathy or Lewis-Sumner syndrome, multifocal acquired sensory and motor neuropathy, and distal acquired demyelinating sensory neuropathy. Although not traditionally classified as an inflammatory disease, ALS has been found to have increased numbers of CD49e macrophages, and may be treated by the methods described herein.

Multiple sclerosis is characterized by various symptoms and signs of CNS dysfunction, with remissions and recurring exacerbations. Classifications of interest for analysis by the methods of the invention include relapsing remitting MS (RRMS), primary progressive MS (PPMS) and secondary progressive MS (SPMS). The most common presenting symptoms are paresthesias in one or more extremities, in the trunk, or on one side of the face; weakness or clumsiness of a leg or hand; or visual disturbances, e.g. partial blindness and pain in one eye (retrobulbar optic neuritis), dimness of vision, or scotomas. Other common early symptoms are ocular palsy resulting in double vision (diplopia), transient weakness of one or more extremities, slight stiffness or unusual fatigability of a limb, minor gait disturbances, difficulty with bladder control, vertigo, and mild emotional disturbances; all indicate scattered CNS involvement and often occur months or years before the disease is recognized. Excess heat can accentuate symptoms and signs.

Neuromyelitis optica (NMO), or Devic's disease, is an autoimmune, inflammatory disorder of the optic nerves and spinal cord. Although inflammation can affect the brain, the disorder is distinct from multiple sclerosis, having a different pattern of response to therapy, possibly a different pattern of autoantigens and involvement of different lymphocyte subsets.

The main symptoms of Devic's disease are loss of vision and spinal cord function. As for other etiologies of optic neuritis, the visual impairment usually manifests as decreased visual acuity, although visual field defects, or loss of color vision can occur in isolation or prior to formal loss of acuity. Spinal cord dysfunction can lead to muscle weakness, reduced sensation, or loss of bladder and bowel control. The damage in the spinal cord can range from inflammatory demyelination to necrotic damage of the white and grey matter. The inflammatory lesions in Devic's disease have been classified as type II lesions (complement mediated demyelinization), but they differ from MS pattern II lesions in their prominent perivascular distribution. Therefore, the pattern of inflammation is often quite distinct from that seen in MS.

Identification of a Cross-Reactive Antigenic Peptide

T cells involved in autoimmune responses can be isolated from patients. Positive immunoselection utilizes a reagent that selectively binds to, for example, CD3, CD4, etc. on the surfaces of T lymphocytes. Negative immunoselection is optionally performed to deplete cells of other lineages, for example B cell markers, monocyte markers, etc. Size, for example forward scatter, can be used to gate out blood cells other than lymphocytes. In some embodiments two, three, four, five or more negative immunoselection reagents are used, e.g. in a cocktail or in separate negative selections. In some embodiments, a lineage cocktail comprising reagents for negative selection of each of myeloid cells; B cells, $CD8^+$ T cells, etc. Where negative separation is used, it is often performed prior to the positive selection, in order to deplete the cell population of undesirable cells. A positive selection is then performed.

Specific binding members, usually antibodies or MHC/peptide tetramers, are added to the suspension of cells, and incubated for a period of time sufficient to bind the available antigens. The incubation will usually be at least about 2 minutes and can be less than about 30 minutes. It is desirable to have a sufficient concentration of antibodies in the reaction mixture so that the efficiency of the separation is not limited by lack of reagent. The appropriate concentration is determined by titration.

The medium in which the cells are separated will be any medium which maintains the viability of the cells. Various media are commercially available and may be used according to the nature of the cells, including Dulbecco's Modified Eagle Medium (dMEM), Hank's Basic Salt Solution (HBSS), Dulbecco's phosphate buffered saline (dPBS), RPMI, Iscove's medium, PBS with 5 mM EDTA, etc. The cells may be placed in culture, formulated for therapy, frozen, etc.

The compositions thus obtained have a variety of uses in clinical therapy, research, development, and commercial purposes. For therapeutic purposes, for example, a therapeutically effective dose may be administered to selectively suppress undesirable pathogenic T cell responses, optionally after expansion in culture.

Expansion or activation in culture may utilize cytokines and/or antigen presenting cells (APC). The contacting may be performed in any suitable culture medium. Where present, APC can be loaded with a suitable peptide antigen or protein, which is then presented on the cell surface. The ratio of T cell to APC, if present, may be anywhere from about 1:20 to about 20:1, and is not critical so long as the number of APC is not limiting. A period of from up to 8 days, up to 10 days, up to 12 days, up to 14 days may be sufficient (see, for example, Dudley et al, JCO 2005; 23(10):2346-2357). The T cells thus primed may be used for any desired purpose, including experimental purposes relating to determination of antigen specificity, cytokine profiling, and the like, and for delivery in vivo.

Cytokines that are useful for expansion in vitro include, without limitation, one or more cytokines that enhance proliferation of CD8+ T cells, which may include, without limitation, Type I IFNs (IFNα and IFNβ), IL-1, IL-2, IL-6, IL-7, IL-12, IL-15, IL-18, IL-21, IL-25, IL-27, IL-33, etc. Cells may be cultured in conventional nutrient media. Commercially available media such as Ham's F10 (Sigma), Minimal Essential Medium ((MEM), Sigma), RPMI 1640 (Sigma), and Dulbecco's Modified Eagle's Medium ((DMEM), Sigma) are suitable for culturing the cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleosides (such as adenosine and thymidine), antibiotics, trace elements, and glucose or an equivalent energy source. Any other necessary supplements may also be included at appropriate concentrations that would be known to those skilled in the art. The culture conditions, such as temperature, pH and the like, are those previously used with the host cell selected for expression, and will be apparent to the ordinarily skilled artisan.

Ex vivo T-cell activation may be achieved by procedures established in the art including cell-based T-cell activation, antibody-based activation or activation using a variety of bead-based activation reagents. Cell-based T-cell activation may be achieved by exposure of the T-cells to antigen presenting cells, such as dendritic cells or artificial antigen presenting cells such as irradiated K562 cells. Antibody based activation of T-cell surface CD3 molecules with soluble anti-CD3 monoclonal antibodies also supports T-cell activation in the presence of IL-2.

T cells can be cultured in contact with a surface providing an agent that stimulates a CD3 TCR complex associated signal (e.g., an anti-CD3 antibody) and an agent that stimulates a co-stimulatory molecule on the surface of the T-cells (e.g an anti-CD28 antibody). Bead-based activation of T-cells may be achieved using commercially available T-cell activation reagents including but not limited to the Invitrogen® CTS Dynabeads® CD3/28 (Life Technologies, Inc. Carlsbad Calif.) or Miltenyi MACS® GMP ExpAct Treg beads or Miltenyi MACS GMP TransAct™ CD3/28 beads (Miltenyi Biotec, Inc.). Conditions appropriate for T-cell culture are well known in the art. Lin, et al. (2009) Cytotherapy 11(7):912-922; Smith, et al. (2015) Clinical & Translational Immunology 4: e31 published online 16 Jan. 2015. The target cells are maintained under conditions necessary to support growth, for example, an appropriate temperature (e.g., 37° C.) and atmosphere (e.g., air plus 5% $CO_2$).

The selected T cells can be used as a source of sequences encoding TCRs providing for antigen-specific disease. The TCR encoding sequences can be isolated by any convenient method, for example as detailed in the Examples.

The TCR of interest can be expressed in soluble form, and multimerized for use as a selective binding agent. The soluble protein may be a single chain, or more usually a heterodimer. In some embodiments, a soluble TCR is modified by the addition of a biotin acceptor peptide sequence at the C terminus of one polypeptide. After biotinylation at the acceptor peptide, the TCR can be multimerized by binding to biotin binding partner, e.g. avidin, streptavidin, traptavidin, neutravidin, etc. The biotin binding partner can comprise a detectable label, e.g. a fluorophore, mass label, etc., or can be bound to a particle, e.g. a paramagnetic particle.

Selection of ligands bound to the TCR can be performed by flow cytometry, magnetic selection, and the like as known in the art.

The TCR multimer is utilized in a binding assay to a library of diverse peptide antigens. The peptide ligand is from about 8 to about 20 amino acids in length, usually from about 8 to about 18 amino acids, from about 8 to about 16 amino acids, from about 8 to about 14 amino acids, from about 8 to about 12 amino acids, from about 10 to about 14 amino acids, from about 10 to about 12 amino acids. It will be appreciated that a fully random library would represent an extraordinary number of possible combinations. In some methods, the diversity is limited at the residues that anchor the peptide to the MHC binding domains, which are referred to herein as MHC anchor residues. The position of the anchor residues in the peptide are determined by the specific MHC binding domains. Diversity may also be limited at other positions as informed by binding studies, e.g. at TCR anchors. At least $10^6$, at least $10^7$, more usually at least $10^8$ different peptide ligands are present in the library.

The MHC proteins used in the libraries may be from any mammalian or avian species; of particular interest are the human HLA proteins. Included in the HLA proteins are the class II subunits HLA-DPα, HLA-DPβ, HLA-DQα, HLA-DQβ, HLA-DRα and HLA-DRβ, and in particular HLA-DR15.

The peptide binding domains of MHC can be expressed in a soluble form of the normally membrane-bound protein. The soluble form is derived from the native form by deletion of the transmembrane domain. Conveniently, the protein is truncated, removing both the cytoplasmic and transmembrane domains. In some such embodiments the binding domains have been subjected to mutagenesis and selected for amino acid changes that enhance the solubility of the single chain polypeptide, without altering the peptide binding contacts. Not more than about 10, usually not more than about 5, preferably none of the amino acids of the transmembrane domain will be included. The deletion will be such that it does not interfere with the ability of the domains to bind peptide ligands.

The library of diverse sequences is generated and inserted into to a vector suitable for the host cell of interest, where the vector can be, without limitation, suitable for expression in yeast cells, and where the yeast cells may be induced to express the polypeptide library. Once introduced in the host cells, expression of the library is induced, and the cells maintained for a period of time sufficient to provide cell surface display of the polypeptides of the library.

Selection for a peptide that binds to the TCR is performed by combining a multimerized TCR with the population of host cells expressing the library. Rounds of selection are performed until the selected population has a signal above background, usually at least three and more usually at least four rounds of selection are performed.

After a final round of selection, polynucleotides are isolated from the selected host cells, and the sequence of the selected peptide ligands are determined, usually by high throughput sequencing.

Sequencing platforms that can be used in the present disclosure include but are not limited to: pyrosequencing, sequencing-by-synthesis, single-molecule sequencing, second-generation sequencing, nanopore sequencing, sequencing by ligation, or sequencing by hybridization. Preferred sequencing platforms are those commercially available from Illumina (RNA-Seq) and Helicos (Digital Gene Expression or "DGE"). "Next generation" sequencing methods include, but are not limited to those commercialized by: 1) 454/ Roche Lifesciences including but not limited to the methods and apparatus described in Margulies et al., Nature (2005) 437:376-380 (2005); and U.S. Pat. Nos. 7,244,559; 7,335,762; 7,211,390; 7,244,567; 7,264,929; 7,323,305; 2) Helicos BioSciences Corporation (Cambridge, MA) as described in U.S. application Ser. No. 11/167,046, and U.S. Pat. Nos. 7,501,245; 7,491,498; 7,276,720; and in U.S. Patent Application Publication Nos. US20090061439; US20080087826; US20060286566; US20060024711; US20060024678; US20080213770; and US20080103058; 3) Applied Biosystems (e.g. SOLiD sequencing); 4) Dover Systems (e.g., Polonator G.007 sequencing); 5) Illumina as described U.S. Pat. Nos. 5,750,341; 6,306,597; and 5,969,119; and 6) Pacific Biosciences as described in U.S. Pat. Nos. 7,462,452; 7,476,504; 7,405,281; 7,170,050; 7,462,468; 7,476,503; 7,315,019; 7,302,146; 7,313,308; and US Application Publication Nos. US20090029385; US20090068655; US20090024331; and US20080206764. All references are herein incorporated by reference. Such methods and apparatuses are provided here by way of example and are not intended to be limiting.

As shown in the Examples, the peptide antigen thus identified may be a native peptide of the individual, or may be cross-reactive peptide that specifically activates pathogenic T cells. The peptide is useful as a screening tool, and finds particular use as a therapeutic agent to activate tolerance.

Peptides, including the cross-reactive peptides disclosed herein, usually comprise at least about 8 amino acids, at least about 9 amino acids, at least about 10 amino acids, at least about 11 amino acids, at least about 12 amino acids, at least about 13 amino acids, at least about 15 amino acids, or more, and may be from about 8 amino acids in length to about 40 amino acids in length, from about 8 to about 30 amino acids in length, from about 8 to about 25, from about 8 to about 20 amino acids in length, from about 8 to about 18 amino acids in length. A peptide may, for example, comprise the provided amino acid sequence as set forth in any of SEQ ID NO:1-4 or SEQ ID NO:23-75, and may further include fusion polypeptides as known in the art in addition to the provided sequences, where the fusion partner is other than a native protein sequence. Peptides useful in this invention also include derivatives, variants, and biologically active fragments of naturally occurring peptides, and the like. The peptide may, for example, comprise 1 amino acid substitution, 2 amino acid substitutions, 3 amino acid substitutions. The peptide sequence may be a designed sequenced derived from mutagenesis in the diverse peptide library. The specificity of the TCR may be conformational, and thus a peptide that activates a T cell of interest may have a sequence essentially unrelated to a native peptide.

Peptides can be modified, e.g., joined to a wide variety of other oligopeptides or proteins for a variety of purposes. For example, post-translationally modified, for example by prenylation, acetylation, amidation, carboxylation, glycosylation, pegylation, etc. Such modifications can also include modifications of glycosylation, e.g. those made by modifying the glycosylation patterns of a polypeptide during its synthesis and processing or in further processing steps; e.g. by exposing the polypeptide to enzymes which affect glycosylation, such as mammalian glycosylating or deglycosylating enzymes. In some embodiments, variants of the present invention include variants having phosphorylated amino acid residues, e.g. phosphotyrosine, phosphoserine, or phosphothreonine.

The ability of a peptide to modulate lymphocyte activity can be determined, for example, by the ability of the peptide to induce a cytotoxic effect on activated pathologic lymphocytes; and the like, as disclosed in the Examples provided herein.

In some embodiments, a peptide is provided as a fusion protein, e.g., fused in frame with a second polypeptide. In some embodiments, the second polypeptide is capable of increasing the size of the fusion protein, e.g., so that the fusion protein will not be cleared from the circulation rapidly. In some other embodiments, the second polypeptide is part or whole of Fc region. In some other embodiments, the second polypeptide is any suitable polypeptide that is substantially similar to Fc, e.g., providing increased size and/or additional binding or interaction with Ig molecules. These fusion proteins can facilitate purification and show an increased half-life in vivo. Fusion proteins having disulfide-linked dimeric structures (due to the IgG) can also be more efficient in binding and neutralizing other molecules than the monomeric secreted protein or protein fragment alone.

In some other embodiments, peptide variants of the present invention include variants further modified to improve their resistance to proteolytic degradation or to optimize solubility properties or to render them more suitable as a therapeutic agent. For example, variants of the present invention further include analogs containing residues other than naturally occurring L-amino acids, e.g. D-amino acids or non-naturally occurring synthetic amino acids. D-amino acids may be substituted for some or all of the amino acid residues.

The polypeptides may be prepared by cell-free translation systems, or synthetic in vitro synthesis, using conventional methods as known in the art. Various commercial synthetic apparatuses are available, for example, automated synthesizers by Applied Biosystems, Inc., Foster City, Calif., Beckman, etc. By using synthesizers, naturally occurring amino acids may be substituted with unnatural amino acids. The particular sequence and the manner of preparation will be determined by convenience, economics, purity required, and the like.

The polypeptides may also be isolated and purified in accordance with conventional methods of recombinant synthesis. A lysate may be prepared of the expression host and the lysate purified using HPLC, exclusion chromatography, gel electrophoresis, affinity chromatography, or other purification technique. For the most part, the compositions which are used will comprise at least 20% by weight of the desired product, more usually at least about 75% by weight, preferably at least about 95% by weight, and for therapeutic purposes, usually at least about 99.5% by weight, in relation to contaminants related to the method of preparation of the product and its purification. Usually, the percentages will be based upon total protein.

Antibodies Related to Cross-Reactive Peptides and TCR that Recognize Such Cross-Reactive Peptides Antibodies may be raised to the cross-reactive peptide(s); to a complex of the cross-reactive peptide(s) and a human MHC protein, including without limitation DR15 protein; or to a TCR responsive to the cross-reactive peptide(s), as described herein. Such antibodies may be therapeutic in blocking the activation of pathogenic T cells. As used in this invention, the term "epitope" means any antigenic determinant on an antigen to which the paratope of an antibody binds. Epitopic determinants usually consist of chemically active surface groupings of molecules such as amino acids or sugar side chains and usually have specific three dimensional structural characteristics, as well as specific charge characteristics.

The term "antibody" is used in the broadest sense and specifically covers monoclonal antibodies (including full length monoclonal antibodies), polyclonal antibodies, multispecific antibodies (e.g., bispecific antibodies), and antibody fragments so long as they exhibit the desired biological activity. "Antibodies" (Abs) and "immunoglobulins" (Igs) are glycoproteins having the same structural characteristics. While antibodies exhibit binding specificity to a specific antigen, immunoglobulins include both antibodies and other antibody-like molecules which lack antigen specificity. Polypeptides of the latter kind are, for example, produced at low levels by the lymph system and at increased levels by myelomas.

As used herein, the term "antibody" refers to a polypeptide that includes canonical immunoglobulin sequence elements sufficient to confer specific binding to a particular target antigen. As is known in the art, intact antibodies as produced in nature are approximately 150 kD tetrameric agents comprised of two identical heavy chain polypeptides (about 50 kD each) and two identical light chain polypeptides (about 25 kD each) that associate with each other into what is commonly referred to as a "Y-shaped" structure. Each heavy chain is comprised of at least four domains (each about 110 amino acids long)—an amino-terminal variable (VH) domain (located at the tips of the Y structure), followed by three constant domains: CH1, CH2, and the carboxy-terminal CH3 (located at the base of the Y's stem). A short region, known as the "switch", connects the heavy chain variable and constant regions. The "hinge" connects CH2 and CH3 domains to the rest of the antibody. Two disulfide bonds in this hinge region connect the two heavy chain polypeptides to one another in an intact antibody. Each light chain is comprised of two domains—an amino-terminal variable (VL) domain, followed by a carboxy-terminal constant (CL) domain, separated from one another by another "switch". Intact antibody tetramers are comprised of two heavy chain-light chain dimers in which the heavy and light chains are linked to one another by a single disulfide bond; two other disulfide bonds connect the heavy chain hinge regions to one another, so that the dimers are connected to one another and the tetramer is formed. Naturally-produced antibodies are also glycosylated, typically on the CH2 domain. Each domain in a natural antibody has a structure characterized by an "immunoglobulin fold" formed from two beta sheets (e.g., 3-, 4-, or 5-stranded sheets) packed against each other in a compressed antiparallel beta barrel. Each variable domain contains three hypervariable loops known as "complement determining regions" (CDR1, CDR2, and CDR3) and four somewhat invariant "framework" regions (FR1, FR2, FR3, and FR4). When natural antibodies fold, the FR regions form the beta sheets that provide the structural framework for the domains, and the CDR loop regions from both the heavy and light chains are brought together in three-dimensional space so that they create a single hypervariable antigen binding site located at the tip of the Y structure.

The Fc region of naturally-occurring antibodies binds to elements of the complement system, and also to receptors on effector cells, including for example effector cells that mediate cytotoxicity, including specifically ADCP. As is known in the art, affinity and/or other binding attributes of Fc regions for Fc receptors can be modulated through glycosylation or other modification. In some embodiments, antibodies produced and/or utilized in accordance with the present invention include glycosylated Fc domains, including Fc domains with modified or engineered such glycosylation. For purposes of the present invention, in certain embodiments, any polypeptide or complex of polypeptides that includes sufficient immunoglobulin domain sequences as found in natural antibodies can be referred to and/or used as an "antibody", whether such polypeptide is naturally produced (e.g., generated by an organism reacting to an antigen), or produced by recombinant engineering, chemical synthesis, or other artificial system or methodology. In some embodiments, an antibody is polyclonal; in some embodiments, an antibody is monoclonal.

In some embodiments, an antibody has constant region sequences that are characteristic of mouse, rabbit, primate, or human antibodies. In some embodiments, antibody sequence elements are humanized, primatized, chimeric, etc., as is known in the art.

Moreover, the term "antibody" as used herein, can refer in appropriate embodiments (unless otherwise stated or clear from context) to any of the art-known or developed constructs or formats for utilizing antibody structural and functional features in alternative presentation. For example, embodiments, an antibody utilized in accordance with the present invention is in a format selected from, but not limited to, intact IgG, IgE and IgM, bi- or multi- specific antibodies (e.g., Zybodies®, etc.), single chain Fvs, polypeptide-Fc fusions, Fabs, cameloid antibodies, masked antibodies (e.g., Probodies®), Small Modular ImmunoPharmaceuticals ("SMIPs™"), single chain or Tandem diabodies (TandAb®), VHHs, Anticalins®, Nanobodies®, minibodies, BiTE®s, ankyrin repeat proteins or DARPINs®, Avimers®, a DART, a TCR-like antibody, Adnectins®, Affilins®, Trans-bodies®, Affibodies®, a TrimerX®, MicroProteins, Fynomers®, Centyrins®, and a KALBITOR®. In some embodiments, an antibody may lack a covalent modification (e.g., attachment of a glycan) that it would have if produced naturally. In some embodiments, an antibody may contain a covalent modification (e.g., attachment of a glycan, a payload, e.g., a detectable moiety, a therapeutic moiety, a catalytic moiety, etc., or other pendant group [e.g., poly-ethylene glycol, etc.

Exemplary antibody agents include, but are not limited to, human antibodies, primatized antibodies, chimeric antibodies, bi-specific antibodies, humanized antibodies, conjugated antibodies (i.e., antibodies conjugated or fused to other proteins, radiolabels, cytotoxins), Small Modular ImmunoPharmaceuticals ("SMIPs™"), single chain antibodies, cameloid antibodies, and antibody fragments. As used herein, the term "antibody agent" also includes intact monoclonal antibodies, polyclonal antibodies, single domain antibodies (e.g., shark single domain antibodies (e.g., IgNAR or fragments thereof)), multispecific antibodies (e.g. bi-specific antibodies) formed from at least two intact antibodies, and antibody fragments so long as they exhibit the desired biological activity. In some embodiments, the term encompasses stapled peptides. In some embodiments, the term encompasses one or more antibody-like binding peptidomimetics. In some embodiments, the term encompasses one or more antibody-like binding scaffold proteins. In come embodiments, the term encompasses monobodies or adnectins.

In many embodiments, an antibody agent is or comprises a polypeptide whose amino acid sequence includes one or more structural elements recognized by those skilled in the art as a complementarity determining region (CDR); in some embodiments an antibody agent is or comprises a polypeptide whose amino acid sequence includes at least one CDR (e.g., at least one heavy chain CDR and/or at least one light chain CDR) that is substantially identical to one found in a reference antibody. In some embodiments an included CDR is substantially identical to a reference CDR in that it is either identical in sequence or contains between 1-5 amino acid substitutions as compared with the reference CDR. In some embodiments an included CDR is substantially identical to a reference CDR in that it shows at least 85%, 86%, 87%, 88%, 89%, 90%, 91%, 92%, 93%, 94%, 95%, 96%, 97%, 98%, 99%, or 100% sequence identity with the reference CDR. In some embodiments an included CDR is substantially identical to a reference CDR in that it shows at least 96%, 96%, 97%, 98%, 99%, or 100% sequence identity with the reference CDR. In some embodiments an included CDR is substantially identical to a reference CDR in that at least one amino acid within the included CDR is deleted, added, or substituted as compared with the reference CDR but the included CDR has an amino acid sequence that is otherwise identical with that of the reference CDR. In some embodiments an included CDR is substantially identical to a reference CDR in that 1-5 amino acids within the included CDR are deleted, added, or substituted as compared with the reference CDR but the included CDR has an amino acid sequence that is otherwise identical to the reference CDR. In some embodiments an included CDR is substantially identical to a reference CDR in that at least one amino acid within the included CDR is substituted as compared with the reference CDR but the included CDR has an amino acid sequence that is otherwise identical with that of the reference CDR. In some embodiments an included CDR is substantially identical to a reference CDR in that 1-5 amino acids within the included CDR are deleted, added, or substituted as compared with the reference CDR but the included CDR has an amino acid sequence that is otherwise identical to the reference CDR. In some embodiments, an antibody agent is or comprises a polypeptide whose amino acid sequence includes structural elements recognized by those skilled in the art as an immunoglobulin variable domain. In some embodiments, an antibody agent is a polypeptide protein having a binding domain which is homologous or largely homologous to an immunoglobulin-binding domain.

"Native antibodies and immunoglobulins" are usually heterotetrameric glycoproteins of about 150,000 daltons, composed of two identical light (L) chains and two identical heavy (H) chains. Each light chain is linked to a heavy chain by one covalent disulfide bond, while the number of disulfide linkages varies between the heavy chains of different immunoglobulin isotypes. Each heavy and light chain also has regularly spaced intrachain disulfide bridges. Each heavy chain has at one end a variable domain ($V_H$) followed by a number of constant domains. Each light chain has a variable domain at one end ($V_L$) and a constant domain at its other end; the constant domain of the light chain is aligned with the first constant domain of the heavy chain, and the light chain variable domain is aligned with the variable domain of the heavy chain. Particular amino acid residues are believed to form an interface between the light- and heavy-chain variable domains (Clothia et al., J. Mol. Biol. 186:651 (1985); Novotny and Haber, Proc. Natl. Acad. Sci. U.S.A. 82:4592 (1985)).

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called complementarity-determining regions (CDRs) or hypervariable regions both in the light-chain and the heavy-chain variable domains. The more highly conserved portions of variable domains are called the framework (FR). The variable domains of native heavy and light chains each comprise four FR regions, largely adopting a b-sheet configuration, connected by three CDRs, which form loops connecting, and in some cases forming part of, the b-sheet structure. The CDRs in each chain are held together in close proximity by the FR regions and, with the CDRs from the other chain, contribute to the formation of the antigen-binding site of antibodies (see Kabat et al., Sequences of Proteins of Immunological Interest, Fifth Edition, National Institute of Health, Bethesda, Md. (1991)). The constant domains are not involved directly in binding an antibody to an antigen, but exhibit various effector functions, such as participation of the antibody in antibody-dependent cellular toxicity.

Papain digestion of antibodies produces two identical antigen-binding fragments, called "Fab" fragments, each with a single antigen-binding site, and a residual "Fc" fragment, whose name reflects its ability to crystallize readily. Pepsin treatment yields an $F(ab')_2$ fragment that has two antigen-combining sites and is still capable of cross-linking antigen.

"Fv" is the minimum antibody fragment which contains a complete antigen-recognition and—binding site. In a two-chain Fv species, this region consists of a dimer of one heavy- and one light-chain variable domain in tight, non-covalent association. In a single-chain Fv species (scFv), one heavy- and one light-chain variable domain can be covalently linked by a flexible peptide linker such that the light and heavy chains can associate in a "dimeric" structure analogous to that in a two-chain Fv species. It is in this configuration that the three CDRs of each variable domain interact to define an antigen-binding site on the surface of the VH-VL dimer. Collectively, the six CDRs confer antigen-binding specificity to the antibody. However, even a single variable domain (or half of an Fv comprising only three CDRs specific for an antigen) has the ability to recognize and bind antigen, although at a lower affinity than the entire binding site. For a review of scFv see Pluckthun, in The Pharmacology of Monoclonal Antibodies, vol. 113, Rosenburg and Moore eds., Springer-Verlag, New York, pp. 269-315 (1994).

The Fab fragment also contains the constant domain of the light chain and the first constant domain (CH1) of the heavy chain. Fab' fragments differ from Fab fragments by the addition of a few residues at the carboxy terminus of the heavy chain CH1 domain including one or more cysteines from the antibody hinge region. Fab'-SH is the designation herein for Fab' in which the cysteine residue(s) of the constant domains bear a free thiol group. $F(ab')_2$ antibody fragments originally were produced as pairs of Fab' fragments which have hinge cysteines between them. Other chemical couplings of antibody fragments are also known.

There are five major classes of immunoglobulins: IgA, IgD, IgE, IgG, and IgM, and several of these can be further divided into subclasses (isotypes), e.g., $IgG_1$, $IgG_2$, $IgG_3$, $IgG_4$, $IgA_1$, $IgA_2$. The heavy-chain constant domains that correspond to the different classes of immunoglobulins are called a, d, e, g, and m, respectively. The subunit structures and three-dimensional configurations of different classes of immunoglobulins are well known. Engineered variants of immunoglobulin subclasses, including those that increase or decrease immune effector functions, half-life, or serum-stability, are also encompassed by this terminology.

"Antibody fragment", and all grammatical variants thereof, as used herein are defined as a portion of an intact antibody comprising the antigen binding site or variable region of the intact antibody, wherein the portion is free of the constant heavy chain domains (i.e. CH2, CH3, and CH4, depending on antibody isotype) of the Fc region of the intact antibody. Examples of antibody fragments include Fab, Fab', Fab'-SH, $F(ab')_2$, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide"), including without limitation (1) single-chain Fv (scFv) molecules (2) single chain polypeptides containing only one light chain variable domain, or a fragment thereof that contains the three CDRs of the light chain variable domain, without an associated heavy chain moiety and (3) single chain polypeptides containing only one heavy chain variable region, or a fragment thereof containing the three CDRs of the heavy chain variable region, without an associated light chain moiety; and multispecific or multivalent structures formed from antibody fragments. In an antibody fragment comprising one or more heavy chains, the heavy chain(s) can contain any constant domain sequence (e.g. CH1 in the IgG isotype) found in a non-Fc region of an intact antibody, and/or can contain any hinge region sequence found in an intact antibody, and/or can contain a leucine zipper sequence fused to or situated in the hinge region sequence or the constant domain sequence of the heavy chain(s).

The term "monoclonal antibody" (mAb) as used herein refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigenic site. Each mAb is directed against a single determinant on the antigen. In addition to their specificity, the monoclonal antibodies are advantageous in that they can be synthesized by hybridoma culture, uncontaminated by other immunoglobulins. The modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made in an immortalized B cell or hybridoma thereof, or may be made by recombinant DNA methods.

An "isolated" antibody is one which has been identified and separated and/or recovered from a component of its natural environment. Contaminant components of its natural environment are materials which would interfere with diagnostic or therapeutic uses for the antibody, and may include enzymes, hormones, and other proteinaceous or nonproteinaceous solutes. In some embodiments, the antibody will be purified (1) to greater than 75% by weight of antibody as determined by the Lowry method, and most preferably more than 80%, 90% or 99% by weight, or (2) to homogeneity by SDS-PAGE under reducing or nonreducing conditions using Coomassie blue or, preferably, silver stain. Isolated antibody includes the antibody in situ within recombinant cells since at least one component of the antibody's natural environment will not be present. Ordinarily, however, isolated antibody will be prepared by at least one purification step.

The terms "specific binding," "specifically binds," and the like, refer to non-covalent or covalent preferential binding to a molecule relative to other molecules or moieties in a solution or reaction mixture (e.g., an antibody specifically binds to a particular polypeptide or epitope relative to other available polypeptides). In some embodiments, the affinity of one molecule for another molecule to which it specifically binds is characterized by a $K_d$ (dissociation constant) of $10^{-5}$ M or less (e.g., $10^{-6}$ M or less, $10^{-7}$ M or less, $10^{-8}$ M or less, $10^{-9}$ M or less, $10^{-10}$ M or less, $10^{-11}$ M or less, $10^{-12}$ M or less, $10^{-13}$ M or less, $10^{-14}$ M or less, $10^{-15}$ M or less, or $10^{-16}$ M or less). "Affinity" refers to the strength of binding, increased binding affinity being correlated with a lower $K_d$.

The term "specific binding member" as used herein refers to a member of a specific binding pair (i.e., two molecules, usually two different molecules, where one of the molecules, e.g., a first specific binding member, through non-covalent means specifically binds to the other molecule, e.g., a second specific binding member).

Therapy and Diagnosis

A peptide or antibody disclosed herein can be provided in pharmaceutical compositions suitable for therapeutic use, e.g. for human treatment. In some embodiments, pharmaceutical compositions include one or more therapeutic entities of the present invention or pharmaceutically acceptable salts, esters or solvates thereof. In some other embodiments, pharmaceutical compositions of the present invention include one or more therapeutic entities of the present invention in combination with another therapeutic agent.

Therapeutic entities are often administered as pharmaceutical compositions comprising an active therapeutic agent and a other pharmaceutically acceptable excipient. The preferred form depends on the intended mode of administration and therapeutic application. The compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, physiological phosphate-buffered saline, Ringer's solutions, dextrose solution, and Hank's solution. In addition, the pharmaceutical composition or formulation may also include other carriers or nontoxic, nontherapeutic, nonimmunogenic stabilizers and the like.

In still some other embodiments, pharmaceutical compositions can also include large, slowly metabolized macromolecules such as proteins, polysaccharides such as chitosan, polylactic acids, polyglycolic acids and copolymers (such as latex functionalized Sepharose™, agarose, cellulose, and the like), polymeric amino acids, amino acid copolymers, and lipid aggregates (such as oil droplets or liposomes).

Also provided are combination therapy methods, where the combination may provide for additive or synergistic benefits. Combinations of a peptide or antibody may be obtained with a second agent selected from one or more of the general classes of drugs commonly used in the non-antigen specific treatment of autoimmune disease, which include corticosteroids and disease modifying drugs; or from an antigen-specific agent. Corticosteroids, e.g. prednisone, methylpredisone, prednisolone, solumedrol, etc. have both anti-inflammatory and immuno locally. They can be given systemically or can be injected locally. Corticosteroids are useful in early disease as temporary adjunctive therapy while waiting for disease modifying agents to exert their effects. Corticosteroids are also useful as chronic adjunctive therapy in patients with severe disease.

Disease modifying drugs are also useful in combined therapy. These agents include methotrexate, leflunomiden etanercept, infliximab, adalimumab, anakinra, rituximab, CTLA4-Ig (abatacept), antimalarials, gold salts, sulfasalazine, d-penicillamine, cyclosporin A, cyclophosphamide azathioprine; and the like. Treatments for MS may include interferon β, Copaxone, and anti-VLA4, which reduce relapse rate. MS is also treated with immunosuppressive agents including methylprednisolone, other steroids, methotrexate, cladribine and cyclophosphamide.

Combination therapies may be sequentially staged, provided in a co-administration formulation, or concomitant administration during the same time period. "Concomitant administration" of a known therapeutic drug with a pharmaceutical composition of the present invention means administration of the drug and peptide at such time that both the known drug and the composition of the present invention will have a therapeutic effect. Such concomitant administration may involve concurrent (i.e. at the same time), prior, or subsequent administration of the drug with respect to the administration of a compound of the invention. A person of ordinary skill in the art would have no difficulty determining the appropriate timing, sequence and dosages of administration for particular drugs and compositions of the present invention.

Peptides or antibodies can serve as the active ingredient in pharmaceutical compositions formulated for the treatment of various disorders as described above. The active ingredient is present in a therapeutically effective amount, i.e., an amount sufficient when administered to treat a disease or medical condition mediated thereby, in particular by reducing the activity of inflammatory lymphocytes. The compositions can also include various other agents to enhance delivery and efficacy, e.g. to enhance delivery and stability of the active ingredients.

Thus, for example, the compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, buffered water, physiological saline, PBS, Ringer's solution, dextrose solution, and Hank's solution. In addition, the pharmaceutical composition or formulation can include other carriers, or non-toxic, nontherapeutic, nonimmunogenic stabilizers, excipients and the like. The compositions can also include additional substances to approximate physiological conditions, such as pH adjusting and buffering agents, toxicity adjusting agents, wetting agents and detergents. The composition can also include any of a variety of stabilizing agents, such as an antioxidant.

The peptide can be complexed with various well-known compounds that enhance the in vivo stability of the polypeptide, or otherwise enhance its pharmacological properties (e.g., increase the half-life of the polypeptide, reduce its toxicity, enhance solubility or uptake). Examples of such modifications or complexing agents include sulfate, gluconate, citrate and phosphate. The polypeptides of a composition can also be complexed with molecules that enhance their in vivo attributes. Such molecules include, for example, carbohydrates, polyamines, amino acids, other peptides, ions (e.g., sodium, potassium, calcium, magnesium, manganese), and lipids.

Further guidance regarding formulations that are suitable for various types of administration can be found in Remington's Pharmaceutical Sciences, Mace Publishing Company, Philadelphia, Pa., 17th ed. (1985). For a brief review of methods for drug delivery, see, Langer, Science 249: 1527-1533 (1990).

The pharmaceutical compositions can be administered for prophylactic and/or therapeutic treatments. Toxicity and therapeutic efficacy of the active ingredient can be determined according to standard pharmaceutical procedures in cell cultures and/or experimental animals, including, for example, determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compounds that exhibit large therapeutic indices are preferred.

The data obtained from cell culture and/or animal studies can be used in formulating a range of dosages for humans. The dosage of the active ingredient typically lies within a range of circulating concentrations that include the $ED_{50}$ with little or no toxicity. The dosage can vary within this range depending upon the dosage form employed and the route of administration utilized.

The pharmaceutical compositions described herein can be administered in a variety of different ways. Examples include administering a composition containing a pharmaceutically acceptable carrier via oral, intranasal, rectal, topical, intraperitoneal, intravenous, intramuscular, subcutaneous, subdermal, transdermal method.

Formulations suitable for parenteral administration, such as, for example, by intravenous, intramuscular, intradermal, intraperitoneal, and subcutaneous routes, include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives.

The components used to formulate the pharmaceutical compositions are preferably of high purity and are substantially free of potentially harmful contaminants (e.g., at least National Food (NF) grade, generally at least analytical grade, and more typically at least pharmaceutical grade). Moreover, compositions intended for in vivo use are preferably sterile. To the extent that a given compound must be synthesized prior to use, the resulting product is preferably substantially free of any potentially toxic agents, such as any endotoxins, which may be present during the synthesis or purification process. Compositions for parental administration are also preferably sterile, substantially isotonic and made under GMP conditions.

The peptide compositions may be administered in a single dose, or in multiple doses, usually multiple doses over a period of time, e.g. daily, every-other day, weekly, semi-weekly, monthly etc. for a period of time sufficient to reduce severity of the inflammatory disease, which may comprise 1, 2, 3, 4, 6, 10, or more doses.

Determining a therapeutically or prophylactically effective amount can be done based on animal data using routine computational methods. In one embodiment, the therapeutically or prophylactically effective amount contains between about 0.1 mg and about 1 g of protein. In another embodiment, the effective amount contains between about 1 mg and about 100 mg of protein. In a further embodiment, the effective amount contains between about 10 mg and about 50 mg of the protein. The effective dose will depend at least in part on the route of administration. The dose may be from about 0.1 µg/kg patient weight; about 1 µg/kg; about 10. µg/kg; to about 100 µg/kg.

In methods of use, an effective dose of an agent of the invention is administered alone, or combined with additional active agents for the treatment of a condition as listed above. The effective dose may be from about 1 ng/kg weight, 10 ng/kg weight, 100 ng/kg weight, 1 µg/kg weight, 10 µg/kg weight, 25 µg/kg weight, 50 µg/kg weight, 100 µg/kg weight, 250 µg/kg weight, 500 µg/kg weight, 750 µg/kg weight, 1 mg/kg weight, 5 mg/kg weight, 10 mg/kg weight, 25 mg/kg weight, 50 mg/kg weight, 75 mg/kg weight, 100 mg/kg weight, 250 mg/kg weight, 500 mg/kg weight, 750 mg/kg weight, and the like. The dosage may be administered multiple times as needed, e.g. every 4 hours, every 6 hours, every 8 hours, every 12 hours, every 18 hours, daily, every 2 days, every 3 days, weekly, and the like. The dosage may be administered orally.

The compositions can be administered in a single dose, or in multiple doses, usually multiple doses over a period of time, e.g. daily, every-other day, weekly, semi-weekly, monthly etc. for a period of time sufficient to reduce severity of the inflammatory disease, which can comprise 1, 2, 3, 4, 6, 10, or more doses.

Determining a therapeutically or prophylactically effective amount of an agent according to the present methods can be done based on animal data using routine computational methods. The effective dose will depend at least in part on the route of administration.

The peptides and complexes of peptides with MHC proteins are also useful in methods of characterizing the immune profile of an individual, particularly for determining the presence of pathogenic T cells having specificity for these peptides and complexes in an individual suspected of having MS or related inflammatory conditions. The methods can comprise contacting a sample comprising T cells from the individual with an immunogenic, cross-reactive peptide, or an MHC complex comprising the peptide, and determining the presence of a T cell response to the peptide or complex. The sample may be any biological sample that comprises T cells, including peripheral blood, lymph node samples, CSF, and the like. The T cell response can be determined by direct binding assays, by determining the presence of T cell receptors associated with specificity to these peptide antigens, by determining the presence of activation markers on T cells, by frequency determination, by determining the presence of enhanced production of cytokines in response to the peptide or complex; and the like as known in the art.

Antigen-Specific Immunotherapy

Antigen-specific immunotherapy aims to take advantage of tolerization, immune deviation and the induction of Tregs in order to promote autoantigen-specific tolerance. Autoimmune diseases are potentially be treated by eliminating pathogenic CD4+ cells that are specific for autoantigens or by blocking the immune response directed by autoantigen-specific T-cells. Some studies have shown immune deviation consistent with Treg generation, peptide-specific IL-10, and increased levels of IFNγ, IL-5, IL-13, IL-17, IL-6, tumor necrosis factor-α (TNFα), and FoxP3 after administration of autoantigens. Another method to induce immunological changes is by manipulation of dendritic cells (DCs). DCs are essential to the induction phase of the immune response and are therefore critically important in determining whether a response toward an antigen will be inflammation or tolerance. DCs can influence if naïve T-cells will undergo deletion, anergy, or differentiation. DC responses to a specific antigen are influenced by the tissue environment and innate stimuli associated with that antigen. Therapies may target DCs to induce tolerance.

For example, the cross-reactive adenovirus peptide may be administered via a tolerogenic route, e.g. by oral or nasal administration of soluble or oligomerized peptides. Alternatively the cross-reactive adenovirus peptide can be used as the basis for an altered peptide ligand (APLs). Altered peptide ligands are analogues derived from an antigenic peptide that comprise amino acid substitutions at TCR contact residues, e.g. a substitution of 1, 2 3 amino acids. TCR engagement by these altered peptide ligands impairs normal T cell function. Altered peptide ligands can specifically antagonize and inhibit T cell activation induced by the cognate antigenic peptide. APLs compete with the native peptide for TCR binding but bind to the TCR with lower affinity, and can thereby function as antagonists or partial agonists. Antagonists induce T-cell anergy, and partial agonists incompletely activate T-cells and can induce immune deviation.

In some embodiments a peptide is formulated for immunization to generate an antigen-specific tolerance, e.g. by subcutaneous or oral administration of a cross-reactive peptide(s). In some embodiments a cross-reactive peptide is formulated for trans-dermal delivery. In some embodiments, a method of inducing immune tolerance comprises trans-dermal administration of cross-reactive peptide(s) this formulated. An effective dose may be a low dose, e.g. a dose of less than about 5 mg, less than about 2.5 mg, less than about 1 mg, less than about 500 µg, less than about 100 µg. In some embodiments a cross-reactive peptide is encapsulated into mannosylated liposomes to enhance enhanced the uptake of the peptides by dendritic cells.

Alternatively, amino acid sequences derived from the TCR of pathogenic T cell clones are administered to induce T-cell-mediated immunoregulation directed at T cells expressing those TCRs. TCR sequences of interest for this purpose include, for example one or a plurality of the peptide sequences set forth in SEQ ID NO:5-22; and 76-83, as shown in FIGS. 1G and 9. Formulation and administration may be, for example, transdermal, intradermal, intramuscular, etc., and may be administered as a dose of, for example, up to 100 mg/kg, up 50 mg/kg, up to 10 mg/kg, up to 5 mg/kg, up to 1 mg/kg, up to 500 µg/kg, up to 100 µg/kg, up to 10 µg/kg, etc., and may further comprise an adjuvant to increase immunogenicity, including without limitation incomplete Freund's adjuvant, complete Freund's adjuvant; etc.

As an alternative to peptide vaccination, DNA vaccines can be formulated in a tolerizing vector of genetically engineered DNA that encodes one or more of the cross-reactive peptides disclosed herein. A tolerizing vector can be formulated and administered by intramuscular injection, for example in a plasmid backbone modified in such a way that it could lead to favorable immunological changes in patients with MS, e.g. reduction in the number of immunostimulatory CpG motifs and increase in the number of immunoinhibitory GpG motifs). A lower dose may be preferred, e.g. a dose of less than 5 mg, e.g. a dose of less than about 5 mg, less than about 2.5 mg, less than about 1 mg, less than about 500 µg, less than about 100 µg.

DNA vectors, for example as described in U.S. Pat. No. 10,098,935 have been shown to provide for tolerization (i.e., induction of antigen-specific tolerance). Such a vector is referred to as a tolerizing vector. The vector can be administered, for example, by local injection, including intramuscular injection, where the vector encodes a cross-reactive adenovirus peptide or protein comprising the peptide, and further comprises a promoter sequence operably linked the nucleic acid sequence; and a DNA backbone, linked to the promoter sequence and the nucleic acid sequence, comprising 4 or fewer immunostimulatory CpG motifs. The cross-reactive peptide may be modified by 1, 2, 3, or more amino acid residues to be altered from the naturally occurring polypeptide.

The invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. Due to biological functional equivalency considerations, changes can be made in protein structure without affecting the biological action in kind or amount. All such modifications are intended to be included within the scope of the appended claims.

Example 1

Screening MS Patient CD4+ T Cells Reveals Antigen Specificity Cross-Reactive with Adenovirus Protein Here we have discovered that T cell receptors in patients with multiple sclerosis (MS) can react with both a common viral antigen (adenovirus) and a major myelin protein (myelin basic protein), using advanced recombinant DNA techniques. This peptide antigen, and its equivalents in other autoimmune diseases, can be used for antigen-specific tolerance protocols in MS patients, and could be both ameliorative and possibly even curative. The same unbiased approach used here may also succeed in finding other causative antigens in other autoimmune diseases.

18 newly diagnosed MS patients PBMCs and 4 healthy controls (HC) PBMC were analyzed. Initially CyToF was performed to determine if there is a difference in the T cell population among HC and MS. It was found that MS patients had higher frequency of brain homing activated T cells, which we single cell sorted and performed paired TCR sequencing and found that MS CD8 T cells were massively expanded, but for MS CD4 T cells, there was minimal expansion. γδ T cells were expanded at the same level as HC. We focused on the CD4 TCR specificity as MS is highly associated with DR150101 (20-30% susceptibility). To identify antigen specificity, we clustered CD4 TCRs with GLIPH. With GLIPH, we were able to identify CD4 TCR clusters which were enriched among DR150101 MS individuals. We picked 9 CD4 TCRs which were clustered with DR15 for antigen discovery. We generated these 9 CD4 TCRs as soluble recombinant proteins and screened 12 MER and 15 MER DR15-yeast library. With screening, among 9 CD4 TCRs, we find enrichment (A647-Myc) and tetramer (PE-TCR Tet) staining for 4 CD4 TCRs (MS-1-MS-4 TCR).

We generated MS1-TCR cell line, co-cultured with T2-DR15 antigen presenting cell line loaded with yeast library generated peptides and were examined for activation. CD69 was used as a marker for T cell activation. Most of the library enriched peptides stimulated MS-1 TCR cell line. We used yeast library enrichment data to predict actual peptides/antigens (self or non-self) for MS-1 CD4 TCRs. Surprisingly, we found an adenovirus peptide (Adeno—ATFTSYR- SWYLA) to be almost identical to enriched peptides, it also stimulated MS-1 TCR cell line.

In addition to yeast library peptide enrichment, an additional layer was added that helps the algorithm to determine the wild type peptide. Essentially, single point mutations were made on the top most enriched library peptide, and we used these positional mutant peptide T cell stimulation data used to better generate a substitution matrix, which in turn was used for algorithm to search for actual peptides from the human proteome. With this positional mutation/refined substitution matrix data, we were able to identify 3 self-peptides for TCR2/MS-1 TCR.

To detect/determine adeno specific T cells directly from MS patients (n=9) and healthy (n=9), we generated pMHC tetramers, enriched, and enumerated CD4's that are specific to the adeno peptide. We were able to detect adeno specific CD4 T cells, which were higher in number among MS patients compared to HC. We also single cell sorted these adeno specific CD4 T cells, sequenced their TCRs, and generated TCR cell lines (adeno specific TCRs).

TCR cell lines from adeno-tetramer sorted CD4 TCRs were tested for cross reactivity with MBP 85-99 peptide. We also tested MS-1 TCR for cross reactivity with MBP. Adeno specific TCRs were stimulated with Adeno peptide and MBP. TCR2/ms-1 TCR and some of the adeno-TCRs (Adeno-TCR1 and 9) cross react with MBP peptide. Serum from MS (n=28) and HC (n=10) was tested for adeno virus titers in the serum. A subset of MS sera had higher adeno virus compared to HC sera. CD3+ T cells from 8 MS and 5 HCs were sorted, and TCR and RNA-seq performed using 10× platform. Additionally, for 4 out of 8 MS patients, T cells from cerebrospinal fluid were sequenced. T cells from cerebrospinal fluid were sequenced in 4 out of 8 MS patients. Clonal expansion was found among CD4+ and CD8+ T cells within CSF of each MS patient.

Generation of a Yeast Peptide-MHC Library.

Recently, Garcia and colleagues have developed yeast peptide-MHC library system for identification of αβ TCR ligands. To discover the peptide antigens for these TCRs, we designed DR15 constructs and generated two different peptide libraries with this mutation and mutagenized the 12 and 15 aa inserts with limited diversity at the primary MHC-binding anchor residues.

Human Samples.

Peripheral blood mononuclear cells (PBMCs) were obtained from healthy blood donations from Stanford Blood Center. Healthy human subjects were male and female, ages 22-47 yrs. PBMCs from Multiple sclerosis patients were obtained from the Multiple Sclerosis Center at the University of California, San Francisco (UCSF). The committee on Human Research at UCSF approved protocol, and informed consent was obtained from all participants.

Generation of Soluble TCRs.

Soluble TCRs were generated as previously described. TCR variable mouse-constant human (VmCh) chimeras containing an engineered C domain disulfide were cloned into the pAcGP67a insect expression vector (BD Biosciences, 554756) encoding either a C-terminal acidic GCN4-zipper-Biotin acceptor peptide (BAP)-6×His tag. Each chain also encoded a 3 C protease site between the C terminus of the TCR ectodomains and the GCN4 zippers to allow for cleavage of zippers. Baculoviruses for each TCR construct were created in SF9 cells via co-transfection of BD baculogold linearized baculovirus DNA (BD Biosciences, 554739) with Cellfectin II (Life Technologies, 10362-100). TCRα and β chain viruses were coinfected in a small volume (2 ml) of High Five cells in various ratios to find a ratio to ensure 1:1 α:β stoichiometry.

To prepare soluble TCRs, 1 L of High Five cells were infected with the appropriate ratio of TCRα and TCRβ viruses for 48 hr at 28° C. Collected culture media was conditioned with 100 mM Tris-HCl (pH 8.0), 1 mM NiCl2, 5 mM CaCl2 and the subsequent precipitation was cleared via centrifugation. The media was then incubated with Ni-NTA resin (QIAGEN 30250) at room temperature for 3 hr and eluted in 1×HBS+200 mM imidazole (pH 7.2). TCRs were then site-specifically biotinylated by adding recombinant BirA ligase, 100 μM biotin, 50 mM Bicine pH 8.3, 10 mM ATP, and 10 mM Magnesium Acetate and incubating 4 C overnight. The reaction was then purified via size-exclusion chromatography using an AKTAPurifier (GE Healthcare) on a Superdex 200 column (GE Healthcare). Peak fractions were pooled and then tested for biotinylation using an SDS-PAGE gel shift assay. Proteins were typically 100% biotinylated.

Generation of a Yeast Displayed DR150101 Peptide Library, Tag Enrichment, Staining, and Selection.

The single chain trimer (SCT) DR150101 yeast constructs were synthesized as N-terminal fusions to the yeast surface protein Aga2p. Full length SCT constructs were cloned into the vector pYAL. These constructs contained an Aga2p leader sequence followed by the 12 or 15MER peptide sequence, a Gly-Ser (GGGGS)3 linker, a second glycine linker (GGGGS)4, the DR150101 sequence, either a Myc or HA epitope tag, a third glycine linker (GGGGS)3, and the Aga2 protein. Constructs were then electroporated into EBY-100 yeast as previously described and induced for expression in SGCAA pH 4.5 media at 20 C 24-72 hr until maximum epitope tag staining was observed (typically 40%-70% of total population). The full length yeast construct was mutagenized as described previously. Briefly, the construct was mutagenized via error prone PCR (Genemorph II kit, Agilent 200550), with final error rate of ~4-5 nucleotide substitutions per kbp as judged by ligating error prone constructs into the pYAL vector and sequencing the clones. Yeast libraries were created by electroporation of competent EBY-100 cells via homologous recombination of linearized pYAL-cMyc/HA vector. Final libraries contained approximately $5 \times 10^8$ yeast transformants.

Peptide libraries were created in the same manner as the error prone libraries, except pMHC constructs were instead randomized along the peptide by using mutagenic primers allowing all 20 amino acids via an NNK codon as previously described. The libraries allowed only limited diversity at the known MHC anchor residues to maximize the number of correctly folded and displayed pMHC clones in the library. For $H2$-$D^b$, P5 and P9 anchors were limited to Asn (N) and Met/Ile/Leu (M/I/L) using AAC and MTS codons, respectively. The resulting PCR product was used as template for a second PCR reaction in which 50 nucleotides of sequence homologous to the vector was added to both ends of the PCR product. Then, 50 ug of this second PCR product and ~10 ug of linearized vector were purified and used for electroporating yeast to create each library. Before selecting on the 12MER and 15MER pMHC libraries, each was enriched for its respective epitope tag to maximize the percentage of yeast in the initial pool with correctly folded and displayed pMHC molecules presented on their surface. To achieve this, each of the libraries was induced separately in 500 mL SGCAA at 20 C for 24-72 hr with a starting density of $1 \times 10^7$ cells/mL. When maximum epitope tag staining was observed, approximately $1.4 \times 10^9$ induced yeast cells were washed once in PBS+0.5% BSA and 1 mM EDTA (PBE buffer) and resuspended in 5 mL PBE with 200 uL of Miltenyi streptavidin microbeads (Miltenyi, 130-048-101). The cell and bead mixture were incubated at 4 C with rotation for 1 hr, washed again in PBE, resuspended in 5 mL PBE, and passed through a cell strainer onto a prewet MACS LD column (Miltenyi 130-042-901). After allowing the column to fully empty, it was washed twice with 2 mL PBE and the flow-through was collected.

Cells were isolated from the flow-through by centrifugation and resuspended in 5 mL PBE with 80 μL of anti-cMyc AlexaFluor647 or anti-HA AlexFluor647 antibody (Cell signaling, 2233 and 3444), respectively incubated at 4 C with rotation for one hour. The cells were washed and resuspended in 5 ml PBE, 220 μL of Miltenyi anti-AlexaFluor647 microbeads were added (Miltenyi, 130-091-395), and this mixture was incubated at 4 C for 30 minutes with rotation and protected from light. The cells were then washed, resuspended in 6 mL PBE, and split evenly between two pre-wet MACS LS columns (Miltenyi, 130-042-401). After allowing the columns to fully empty, each column was washed two times with 3 mL of PBE and the flow-through was set aside. The cells were eluted from the columns with 5 mL PBE per column. A small fraction of the eluate (5-20 μL) was reserved to compare AlexaFluor647 staining to that of the flow through for a quantification of tag enrichment. The rest of the eluted cells were pooled, collected by centrifugation, resuspended in a total of 40 mL SDCAA media, and the cell density was measured by spectrophotometer at 600 nm. The cell density was then adjusted to an OD of or less with the addition of SDCAA, and the yeast were cultured at 30 C overnight. The cells were the passaged for another round of overnight growth in SDCAA.

For induction of the tag eluate were taken for culture at 20 C in 500 mL of SGCAA. To stain pMHC with TCR tetramers, biotinylated TCR was incubated with streptavidin coupled to AlexaFluor647, AlexaFluor488, or Phycoerythrin in a 5:1 ratio for 5 min on ice to ensure complete tetramer formation. Yeast cells were then stained with 250 nM tetramer+anti-Myc-AlexaFluor488 or anti-HA-AlexaFluor488 antibodies (Cell Signaling, 2279 or 2350, respectively) for 3 hr on ice and washed twice with ice cold PBE buffer before analysis via flow cytometry (Accuri C6 flow cytometer). All the yeast selections and sequencing of yeast libraries were done as previously described.

Peptide-MHC Tetramer Formation:

All tetramers were freshly prepared as previously described. Briefly, for tetramerization, the amount of fluorophore-conjugated streptavidin and pMHC monomer were mixed with 4:1 molar ratio. One fifth amount of the fluorophore-conjugated streptavidin was added to the monomer solution every 10 minutes in room temperature.

Enrichment of Tetramer-Positive T Cells in Cell Lines:

The cells were tetramer stained for an hour at room temperature and washed with FACS buffer. Following tetramer enrichment, cells were surface stained with an antibody cocktail for 20 minutes at 4 C. Stained cells were washed using FACS buffer and analyzed on LSR II (Becton Dickinson) or single cell sorted/bulk sorted on FACS Aria Fusion SORP (Becton Dickinson). Lentivirally TCR transduced Jurkat TCRαβ$^{-/-}$ cell lines were stained with tetramers at 20 nM concentration in FACS buffer with 10 pM biotin at room temperate for 1 hr and followed by surface staining with appropriate antibodies for 20 minutes 4 C. Following surface staining the cells were washed with FACS buffer and analyzed on LSR II (Becton Dickinson).

Expression of TCRs by Lentiviral Transduction.

TCRα, β constructs were cloned into a lentiviral construct. For TCR expression, alpha and beta TCR lentiviral constructs were transfected into 293x cells separately. The virus was harvested after 72 hr of transfection and transduced into Jurkat αβ$^{-/-}$ or SKW αβ$^{-/-}$ cells. SKW or Jurkat cells were enriched for highest expression of TCRαβ by using a Miltenyi anti-APC selection (Miltenyi 130-090-855).

T Cell Stimulation Assays.

T cell stimulation assays were performed as previously described. All the T cell peptide stimulation experiments were done in 96 well round bottom plates with a 200 μl total volume. T2, K562 cells or BMDCs were pulsed with 10-100 ug of the peptides for 45 minutes, washed once and plated (10,000 cells/well). Cell lines expressing TCRs (100, 000 cells/well) were co-cultured with APCs for 18 hr. At the end of stimulation, cells were harvested, washed, and stained with TCRβ, human CD3, and CD69 and analyzed on LSR II (Becton Dickinson) for activation.

Whole Transcriptome Sequencing and Data Analysis.

Whole transcriptome sequencing was done as previously described, T cells were bulk sorted directly into Trizol (Qaigen). RNA was extracted with a RNeasy Plus Micro Kit (Qiagen). After analysis on the 2100 Bioanalyzer and the resulting library was sequenced on the HiSeq 4000 platform (Illumina). For each sample in the whole transcriptome sequencing library, 75-basepair paired-end reads were acquired from the sequencer. Each sample condition was completed in triplicate, except for the WT sample for which one sample was generated. Read quality was determined with FastQC 0.11.4. Using TopHat v2.0.13, we aligned the reads to the mouse reference genome (NCBI/assembly GRCm38). On average, 90% of reads were aligned to the reference genome. Differential gene expression analysis and read count normaization used as input for heatmaps were determined via DESeq251. TPM values were calculated with RSEM v1.3.052. Heatmaps were generated with the R package "pheatmap". Gene ontology analysis plots were generated with the R package "enrichplot". Data availability RNA-seq data and Yeast p-MHC selection data are deposited to the Gene Expression Omnibus (GEO) data repository with accession number GSE130975.

```
Sequences
T cell receptors sequences from FIG. 1G.
CDR3b
                                           SEQ ID NO: 5
CASSGTGNTEAFF

SEQ ID NO: 6
CASSHNSYEQYF

SEQ ID NO: 7
CASSQEAGNNQPQHF

SEQ ID NO: 8
CASSPPRNYGYTF

SEQ ID NO: 9
CATSRPGGYEQYF

SEQ ID NO: 10
CASSPGTPNYGYTF

SEQ ID NO: 11
CASSSYTGTSGNTGELFF

SEQ ID NO: 12
CASSLGGTYSNQPQHF
```

-continued

CASRRPQEGTEAFF
SEQ ID NO: 13

CDR3a
CAENQAGTALIF
SEQ ID NO: 14

CALTLQNRDDKIIF
SEQ ID NO: 15

CALTLQNRDDKIIF
SEQ ID NO: 16

CALTLQNRDDKIIF
SEQ ID NO: 17

CALTLQNRDDKIIF
SEQ ID NO: 18

CALTLQNRDDKIIF
SEQ ID NO: 19

CAVSYTGFQKLVF
SEQ ID NO: 20

CVVRRRSNFGNEKLTF
SEQ ID NO: 21

CATDATGTASKLTF
SEQ ID NO: 22

Peptide antigens from FIG. 2
CQVSVQQYRTWYLHR
SEQ ID NO: 23

AMSTVLSYRSWYVPR
SEQ ID NO: 24

RNELIGMYRSWYLSR
SEQ ID NO: 25

NSDGIISYRSWYIRR
SEQ ID NO: 26

FERGILFYRSWYLLR
SEQ ID NO: 27

SNTHLVSFRTWYASR
SEQ ID NO: 28

SSRYIQSYRSWYLGR
SEQ ID NO: 29

SSSSVIQYRSWYVPR
SEQ ID NO: 30

IQVSIFSYRSWYLSR
SEQ ID NO: 31

LDRTLLSYRSWYGKR
SEQ ID NO: 32

DMGTIVSYRSWYAHR
SEQ ID NO: 33

CSSHIFSYRSWYSYR
SEQ ID NO: 34

QRSPVRSYRSWYALR
SEQ ID NO: 35

VSSEVWNFHRSWYLR
SEQ ID NO: 36

VEQYLAGYRSWYLLR
SEQ ID NO: 37

ASEEIVMYRTWYLLR
SEQ ID NO: 38

SEQ ID NO: 39
AKTRVIQYRSWYAIR

EFANVRSYRSWYIHR
SEQ ID NO: 40

AQHEIVHFRSWYLRG
SEQ ID NO: 41

THRDIYSYRSWYIGR
SEQ ID NO: 42

ARIQSYRSWYLKAVA
SEQ ID NO: 43

ARIQSYRSWYSK
SEQ ID NO: 44

ADLNMHRSWYLK
SEQ ID NO: 45

ATFTSYRSWYSK
SEQ ID NO: 46

ADLNMHRSWYLT
SEQ ID NO: 47

ATFTSYRSWYLK
SEQ ID NO: 48

ARIQSYRSWYLT
SEQ ID NO: 49

ADLNMHRSWYSK
SEQ ID NO: 50

ATFTSYRSWYLT
SEQ ID NO: 51

ARIQSYRSWYLK
SEQ ID NO: 52

Peptide antigens from FIG. 4
ANYGKARSWYLK
SEQ ID NO: 53

ARDTSESSSFLK
SEQ ID NO: 54

AFQDSYRNLTLK
SEQ ID NO: 55

IDRHMYHSLYLK
SEQ ID NO: 56

AELQSLEQSHLK
SEQ ID NO: 57

ADLQDTASLTLK
SEQ ID NO: 58

AKLQDFHQWYLA
SEQ ID NO: 59

ARIQNRRWQRLT
SEQ ID NO: 60

ADITDGNSEHLK
SEQ ID NO: 61

DKGQQYRNWFLK
SEQ ID NO: 62

AMTTQARSSYLA
SEQ ID NO: 63

RRPQRHRSWHLA
SEQ ID NO: 64

ATIAERRNLVLK
SEQ ID NO: 65

-continued

AEMTSKHQEYLK
SEQ ID NO: 66

HLIDQYDSLYSK
SEQ ID NO: 67

LIIKSYRKYHSK
SEQ ID NO: 68

GFFQTYDTEYLK
SEQ ID NO: 69

CRLNSFWTWWLK
SEQ ID NO: 70

ARGTTTRRSRLK
SEQ ID NO: 71

AAGGKYRSTVSK
SEQ ID NO: 72

SCIRSYSSIVLK
SEQ ID NO: 73

PNPREVESWYLK
SEQ ID NO: 74

PLVTDEDSWYSK
SEQ ID NO: 75

T cell receptors from FIG. 9
CDR3b

CSARDLTSGANNEQF
SEQ ID NO: 76

CASSHNSYEQYF
SEQ ID NO: 77

CASSPRQEYGYTF
SEQ ID NO: 78

CASTGSYREVGVAAETQYF
SEQ ID NO: 79

CDR3a

CATDTTSGTYKYIF
SEQ ID NO: 80

-continued

CALTLQNRDDKILF
SEQ ID NO: 81

CAEKAYGNNRLAF
SEQ ID NO: 82

CVVLPGYNKLIF
SEQ ID NO: 83

Peptide antigens from FIG. 9

ENPVVHFFKNIVTPR
SEQ ID NO: 84

ATFTSYRSWYLA
SEQ ID NO: 1

ANYGKARSWYLK
SEQ ID NO: 2

IDRHMYHSYLK
SEQ ID NO: 3

DKGQQYRNWFLK
SEQ ID NO: 4

Each publication cited in this specification is hereby incorporated by reference in its entirety for all purposes.

It is to be understood that this invention is not limited to the particular methodology, protocols, cell lines, animal species or genera, and reagents described, as such may vary. It is also to be understood that the terminology used herein is for the purpose of describing particular embodiments only, and is not intended to limit the scope of the present invention, which will be limited only by the appended claims.

As used herein the singular forms "a", "and", and "the" include plural referents unless the context clearly dictates otherwise. Thus, for example, reference to "a cell" includes a plurality of such cells and reference to "the culture" includes reference to one or more cultures and equivalents thereof known to those skilled in the art, and so forth. All technical and scientific terms used herein have the same meaning as commonly understood to one of ordinary skill in the art to which this invention belongs unless clearly indicated otherwise.

What is claimed is:

1. An isolated cross-reactive peptide that comprises or consists of an amino acid sequence of any one of ATFTSYRSWYLA (SEQ ID NO: 1), ANYGKARSWYLK (SEQ ID NO:2), IDRHMYHSYLK (SEQ ID NO:3), DKGQQYRNWFLK (SEQ ID NO: 4), SEQ ID NOs: 23-75, or a variant thereof comprising up to 3 amino acid substitutions or deletions, wherein the isolated cross-reactive peptide is up to 40 amino acids in length.

2. The cross-reactive peptide according to claim 1 fused to a non-native protein sequence.

3. A pharmaceutical composition comprising the isolated cross-reactive peptide of claim 1 and a pharmaceutically acceptable excipient.

4. A protein complex comprising a human MHC protein and the cross-reactive peptide of claim 1.

5. The protein complex of claim 4, wherein the MHC protein is a Class II MHC protein.

6. The protein complex of claim 5, wherein the MHC protein is DR15.

7. An altered peptide ligand of the cross-reactive peptide of claim 1.

8. A method of reducing the symptoms of multiple sclerosis, the method comprising administering a tolerogenic dose of the pharmaceutical composition of claim 3.

9. The method of claim 8, wherein the pharmaceutical composition is administered orally, nasally, intradermally, transdermally or intramuscularly.

10. A tolerizing DNA construct encoding the cross-reactive peptide of claim 1.

11. The tolerizing DNA construct of claim 10, wherein the construct is in a modified plasmid backbone.

12. A method of reducing the symptoms of multiple sclerosis, the method comprising administering a tolerogenic dose of the tolerizing DNA construct of claim 10.

13. The method of claim 12, wherein the tolerizing DNA construct is administered intramuscularly.

14. An isolated T cell receptor (TCR) peptide that comprises or consists of an amino acid sequence set forth in any of SEQ ID NO: 5, 7-22 or 76, 78-83 or a variant thereof comprising up to 3 amino acid substitutions or deletions wherein the isolated cross-reactive peptide is up to 40 amino acids in length.

15. The isolated TCR peptide according to claim 14 fused to a non-native protein sequence.

16. A pharmaceutical composition comprising the isolated TCR peptide of claim 14.

17. The pharmaceutical composition of claim 16, further comprising an adjuvant.

18. A method of reducing the symptoms of multiple sclerosis, the method comprising administering an immunogenic dose of the TCR peptide according to claim 14.

19. An antibody that specifically binds to:
a protein complex of claim 4.

20. A method of determining the presence of pathogenic T cells in an individual suspected of having multiple sclerosis, the method comprising:
contacting a sample comprising T cells from the individual with the cross-reactive peptide of claim 1; and
determining the presence of a T cell response to the cross-reactive peptide.

* * * * *

SEQUENCE LISTING

<160> NUMBER OF SEQ ID NOS: 88

<210> SEQ ID NO 1
<211> LENGTH: 12
<212> TYPE: PRT
<213> ORGANISM: Artificial sequence
<220> FEATURE:
<223> OTHER INFORMATION: synthetic sequence

<400> SEQUENCE: 1

Ala Thr Phe Thr Ser Tyr Arg Ser Trp Tyr Leu Ala
1               5                   10

<210> SEQ ID NO 2
<211> LENGTH: 12
<212> TYPE: PRT
<213> ORGANISM: Artificial sequence
<220> FEATURE:
<223> OTHER INFORMATION: synthetic sequence

<400> SEQUENCE: 2

Ala Asn Tyr Gly Lys Ala Arg Ser Trp Tyr Leu Lys
1               5                   10

```
<210> SEQ ID NO 3
<211> LENGTH: 11
<212> TYPE: PRT
<213> ORGANISM: Artificial sequence
<220> FEATURE:
<223> OTHER INFORMATION: synthetic sequence

<400> SEQUENCE: 3

Ile Asp Arg His Met Tyr His Ser Tyr Leu Lys
1               5                   10

<210> SEQ ID NO 4
<211> LENGTH: 12
<212> TYPE: PRT
<213> ORGANISM: Artificial sequence
<220> FEATURE:
<223> OTHER INFORMATION: synthetic sequence

<400> SEQUENCE: 4

Asp Lys Gly Gln Gln Tyr Arg Asn Trp Phe Leu Lys
1               5                   10

<210> SEQ ID NO 5
<211> LENGTH: 13
<212> TYPE: PRT
<213> ORGANISM: Artificial sequence
<220> FEATURE:
<223> OTHER INFORMATION: synthetic sequence

<400> SEQUENCE: 5

Cys Ala Ser Ser Gly Thr Gly Asn Thr Glu Ala Phe Phe
1               5                   10

<210> SEQ ID NO 6
<211> LENGTH: 12
<212> TYPE: PRT
<213> ORGANISM: Artificial sequence
<220> FEATURE:
<223> OTHER INFORMATION: synthetic sequence

<400> SEQUENCE: 6

Cys Ala Ser Ser His Asn Ser Tyr Glu Gln Tyr Phe
1               5                   10

<210> SEQ ID NO 7
<211> LENGTH: 15
<212> TYPE: PRT
<213> ORGANISM: Artificial sequence
<220> FEATURE:
<223> OTHER INFORMATION: synthetic sequence

<400> SEQUENCE: 7

Cys Ala Ser Ser Gln Glu Ala Gly Asn Asn Gln Pro Gln His Phe
1               5                   10                  15

<210> SEQ ID NO 8
<211> LENGTH: 13
<212> TYPE: PRT
<213> ORGANISM: Artificial sequence
<220> FEATURE:
<223> OTHER INFORMATION: synthetic sequence

<400> SEQUENCE: 8

Cys Ala Ser Ser Pro Pro Arg Asn Tyr Gly Tyr Thr Phe
1               5                   10
```

```
<210> SEQ ID NO 9
<211> LENGTH: 13
<212> TYPE: PRT
<213> ORGANISM: Artificial sequence
<220> FEATURE:
<223> OTHER INFORMATION: synthetic sequence

<400> SEQUENCE: 9

Cys Ala Thr Ser Arg Pro Gly Gly Tyr Glu Gln Tyr Phe
1               5                   10

<210> SEQ ID NO 10
<211> LENGTH: 14
<212> TYPE: PRT
<213> ORGANISM: Artificial sequence
<220> FEATURE:
<223> OTHER INFORMATION: synthetic sequence

<400> SEQUENCE: 10

Cys Ala Ser Ser Pro Gly Thr Pro Asn Tyr Gly Tyr Thr Phe
1               5                   10

<210> SEQ ID NO 11
<211> LENGTH: 18
<212> TYPE: PRT
<213> ORGANISM: Artificial sequence
<220> FEATURE:
<223> OTHER INFORMATION: synthetic sequence

<400> SEQUENCE: 11

Cys Ala Ser Ser Ser Tyr Thr Gly Thr Ser Gly Asn Thr Gly Glu Leu
1               5                   10                  15

Phe Phe

<210> SEQ ID NO 12
<211> LENGTH: 16
<212> TYPE: PRT
<213> ORGANISM: Artificial sequence
<220> FEATURE:
<223> OTHER INFORMATION: synthetic sequence

<400> SEQUENCE: 12

Cys Ala Ser Ser Leu Gly Gly Thr Tyr Ser Asn Gln Pro Gln His Phe
1               5                   10                  15

<210> SEQ ID NO 13
<211> LENGTH: 14
<212> TYPE: PRT
<213> ORGANISM: Artificial sequence
<220> FEATURE:
<223> OTHER INFORMATION: synthetic sequence

<400> SEQUENCE: 13

Cys Ala Ser Arg Arg Pro Gln Glu Gly Thr Glu Ala Phe Phe
1               5                   10

<210> SEQ ID NO 14
<211> LENGTH: 12
<212> TYPE: PRT
<213> ORGANISM: Artificial sequence
<220> FEATURE:
<223> OTHER INFORMATION: synthetic sequence

<400> SEQUENCE: 14

Cys Ala Glu Asn Gln Ala Gly Thr Ala Leu Ile Phe
1               5                   10
```

```
<210> SEQ ID NO 15
<211> LENGTH: 14
<212> TYPE: PRT
<213> ORGANISM: Artificial sequence
<220> FEATURE:
<223> OTHER INFORMATION: synthetic sequence

<400> SEQUENCE: 15

Cys Ala Leu Thr Leu Gln Asn Arg Asp Asp Lys Ile Ile Phe
1               5                   10

<210> SEQ ID NO 16
<211> LENGTH: 14
<212> TYPE: PRT
<213> ORGANISM: Artificial sequence
<220> FEATURE:
<223> OTHER INFORMATION: synthetic sequence

<400> SEQUENCE: 16

Cys Ala Leu Thr Leu Gln Asn Arg Asp Asp Lys Ile Ile Phe
1               5                   10

<210> SEQ ID NO 17
<211> LENGTH: 14
<212> TYPE: PRT
<213> ORGANISM: Artificial sequence
<220> FEATURE:
<223> OTHER INFORMATION: synthetic sequence

<400> SEQUENCE: 17

Cys Ala Leu Thr Leu Gln Asn Arg Asp Asp Lys Ile Ile Phe
1               5                   10

<210> SEQ ID NO 18
<211> LENGTH: 14
<212> TYPE: PRT
<213> ORGANISM: Artificial sequence
<220> FEATURE:
<223> OTHER INFORMATION: synthetic sequence

<400> SEQUENCE: 18

Cys Ala Leu Thr Leu Gln Asn Arg Asp Asp Lys Ile Ile Phe
1               5                   10

<210> SEQ ID NO 19
<211> LENGTH: 14
<212> TYPE: PRT
<213> ORGANISM: Artificial sequence
<220> FEATURE:
<223> OTHER INFORMATION: synthetic sequence

<400> SEQUENCE: 19

Cys Ala Leu Thr Leu Gln Asn Arg Asp Asp Lys Ile Ile Phe
1               5                   10

<210> SEQ ID NO 20
<211> LENGTH: 13
<212> TYPE: PRT
<213> ORGANISM: Artificial sequence
<220> FEATURE:
<223> OTHER INFORMATION: synthetic sequence

<400> SEQUENCE: 20

Cys Ala Val Ser Tyr Thr Gly Phe Gln Lys Leu Val Phe
1               5                   10
```

```
<210> SEQ ID NO 21
<211> LENGTH: 16
<212> TYPE: PRT
<213> ORGANISM: Artificial sequence
<220> FEATURE:
<223> OTHER INFORMATION: synthetic sequence

<400> SEQUENCE: 21

Cys Val Val Arg Arg Arg Ser Asn Phe Gly Asn Glu Lys Leu Thr Phe
1               5                   10                  15

<210> SEQ ID NO 22
<211> LENGTH: 14
<212> TYPE: PRT
<213> ORGANISM: Artificial sequence
<220> FEATURE:
<223> OTHER INFORMATION: synthetic sequence

<400> SEQUENCE: 22

Cys Ala Thr Asp Ala Thr Gly Thr Ala Ser Lys Leu Thr Phe
1               5                   10

<210> SEQ ID NO 23
<211> LENGTH: 15
<212> TYPE: PRT
<213> ORGANISM: Artificial sequence
<220> FEATURE:
<223> OTHER INFORMATION: synthetic sequence

<400> SEQUENCE: 23

Cys Gln Val Ser Val Gln Gln Tyr Arg Thr Trp Tyr Leu His Arg
1               5                   10                  15

<210> SEQ ID NO 24
<211> LENGTH: 15
<212> TYPE: PRT
<213> ORGANISM: Artificial sequence
<220> FEATURE:
<223> OTHER INFORMATION: synthetic sequence

<400> SEQUENCE: 24

Ala Met Ser Thr Val Leu Ser Tyr Arg Ser Trp Tyr Val Pro Arg
1               5                   10                  15

<210> SEQ ID NO 25
<211> LENGTH: 15
<212> TYPE: PRT
<213> ORGANISM: Artificial sequence
<220> FEATURE:
<223> OTHER INFORMATION: synthetic sequence

<400> SEQUENCE: 25

Arg Asn Glu Leu Ile Gly Met Tyr Arg Ser Trp Tyr Leu Ser Arg
1               5                   10                  15

<210> SEQ ID NO 26
<211> LENGTH: 15
<212> TYPE: PRT
<213> ORGANISM: Artificial sequence
<220> FEATURE:
<223> OTHER INFORMATION: synthetic sequence

<400> SEQUENCE: 26

Asn Ser Asp Gly Ile Ile Ser Tyr Arg Ser Trp Tyr Ile Arg Arg
1               5                   10                  15

<210> SEQ ID NO 27
```

```
<211> LENGTH: 15
<212> TYPE: PRT
<213> ORGANISM: Artificial sequence
<220> FEATURE:
<223> OTHER INFORMATION: synthetic sequence

<400> SEQUENCE: 27

Phe Glu Arg Gly Ile Leu Phe Tyr Arg Ser Trp Tyr Leu Leu Arg
1               5                   10                  15

<210> SEQ ID NO 28
<211> LENGTH: 15
<212> TYPE: PRT
<213> ORGANISM: Artificial sequence
<220> FEATURE:
<223> OTHER INFORMATION: synthetic sequence

<400> SEQUENCE: 28

Ser Asn Thr His Leu Val Ser Phe Arg Thr Trp Tyr Ala Ser Arg
1               5                   10                  15

<210> SEQ ID NO 29
<211> LENGTH: 15
<212> TYPE: PRT
<213> ORGANISM: Artificial sequence
<220> FEATURE:
<223> OTHER INFORMATION: synthetic sequence

<400> SEQUENCE: 29

Ser Ser Arg Tyr Ile Gln Ser Tyr Arg Ser Trp Tyr Leu Gly Arg
1               5                   10                  15

<210> SEQ ID NO 30
<211> LENGTH: 15
<212> TYPE: PRT
<213> ORGANISM: Artificial sequence
<220> FEATURE:
<223> OTHER INFORMATION: synthetic sequence

<400> SEQUENCE: 30

Ser Ser Ser Ser Val Ile Gln Tyr Arg Ser Trp Tyr Val Pro Arg
1               5                   10                  15

<210> SEQ ID NO 31
<211> LENGTH: 15
<212> TYPE: PRT
<213> ORGANISM: Artificial sequence
<220> FEATURE:
<223> OTHER INFORMATION: synthetic sequence

<400> SEQUENCE: 31

Ile Gln Val Ser Ile Phe Ser Tyr Arg Ser Trp Tyr Leu Ser Arg
1               5                   10                  15

<210> SEQ ID NO 32
<211> LENGTH: 15
<212> TYPE: PRT
<213> ORGANISM: Artificial sequence
<220> FEATURE:
<223> OTHER INFORMATION: synthetic sequence

<400> SEQUENCE: 32

Leu Asp Arg Thr Leu Leu Ser Tyr Arg Ser Trp Tyr Gly Lys Arg
1               5                   10                  15

<210> SEQ ID NO 33
<211> LENGTH: 15
```

<212> TYPE: PRT
<213> ORGANISM: Artificial sequence
<220> FEATURE:
<223> OTHER INFORMATION: synthetic sequence

<400> SEQUENCE: 33

Asp Met Gly Thr Ile Val Ser Tyr Arg Ser Trp Tyr Ala His Arg
1               5                   10                  15

<210> SEQ ID NO 34
<211> LENGTH: 15
<212> TYPE: PRT
<213> ORGANISM: Artificial sequence
<220> FEATURE:
<223> OTHER INFORMATION: synthetic sequence

<400> SEQUENCE: 34

Cys Ser Ser His Ile Phe Ser Tyr Arg Ser Trp Tyr Ser Tyr Arg
1               5                   10                  15

<210> SEQ ID NO 35
<211> LENGTH: 15
<212> TYPE: PRT
<213> ORGANISM: Artificial sequence
<220> FEATURE:
<223> OTHER INFORMATION: synthetic sequence

<400> SEQUENCE: 35

Gln Arg Ser Pro Val Arg Ser Tyr Arg Ser Trp Tyr Ala Leu Arg
1               5                   10                  15

<210> SEQ ID NO 36
<211> LENGTH: 15
<212> TYPE: PRT
<213> ORGANISM: Artificial sequence
<220> FEATURE:
<223> OTHER INFORMATION: synthetic sequence

<400> SEQUENCE: 36

Val Ser Ser Glu Val Trp Asn Phe His Arg Ser Trp Tyr Leu Arg
1               5                   10                  15

<210> SEQ ID NO 37
<211> LENGTH: 15
<212> TYPE: PRT
<213> ORGANISM: Artificial sequence
<220> FEATURE:
<223> OTHER INFORMATION: synthetic sequence

<400> SEQUENCE: 37

Val Glu Gln Tyr Leu Ala Gly Tyr Arg Ser Trp Tyr Leu Leu Arg
1               5                   10                  15

<210> SEQ ID NO 38
<211> LENGTH: 15
<212> TYPE: PRT
<213> ORGANISM: Artificial sequence
<220> FEATURE:
<223> OTHER INFORMATION: synthetic sequence

<400> SEQUENCE: 38

Ala Ser Glu Glu Ile Val Met Tyr Arg Thr Trp Tyr Leu Leu Arg
1               5                   10                  15

<210> SEQ ID NO 39
<211> LENGTH: 15
<212> TYPE: PRT

```
<213> ORGANISM: Artificial sequence
<220> FEATURE:
<223> OTHER INFORMATION: synthetic sequence

<400> SEQUENCE: 39

Ala Lys Thr Arg Val Ile Gln Tyr Arg Ser Trp Tyr Ala Ile Arg
1               5                   10                  15

<210> SEQ ID NO 40
<211> LENGTH: 15
<212> TYPE: PRT
<213> ORGANISM: Artificial sequence
<220> FEATURE:
<223> OTHER INFORMATION: synthetic sequence

<400> SEQUENCE: 40

Glu Phe Ala Asn Val Arg Ser Tyr Arg Ser Trp Tyr Ile His Arg
1               5                   10                  15

<210> SEQ ID NO 41
<211> LENGTH: 15
<212> TYPE: PRT
<213> ORGANISM: Artificial sequence
<220> FEATURE:
<223> OTHER INFORMATION: synthetic sequence

<400> SEQUENCE: 41

Ala Gln His Glu Ile Val His Phe Arg Ser Trp Tyr Leu Arg Gly
1               5                   10                  15

<210> SEQ ID NO 42
<211> LENGTH: 15
<212> TYPE: PRT
<213> ORGANISM: Artificial sequence
<220> FEATURE:
<223> OTHER INFORMATION: synthetic sequence

<400> SEQUENCE: 42

Thr His Arg Asp Ile Tyr Ser Tyr Arg Ser Trp Tyr Ile Gly Arg
1               5                   10                  15

<210> SEQ ID NO 43
<211> LENGTH: 15
<212> TYPE: PRT
<213> ORGANISM: Artificial sequence
<220> FEATURE:
<223> OTHER INFORMATION: synthetic sequence

<400> SEQUENCE: 43

Ala Arg Ile Gln Ser Tyr Arg Ser Trp Tyr Leu Lys Ala Val Ala
1               5                   10                  15

<210> SEQ ID NO 44
<211> LENGTH: 12
<212> TYPE: PRT
<213> ORGANISM: Artificial sequence
<220> FEATURE:
<223> OTHER INFORMATION: synthetic sequence

<400> SEQUENCE: 44

Ala Arg Ile Gln Ser Tyr Arg Ser Trp Tyr Ser Lys
1               5                   10

<210> SEQ ID NO 45
<211> LENGTH: 12
<212> TYPE: PRT
<213> ORGANISM: Artificial sequence
```

```
<220> FEATURE:
<223> OTHER INFORMATION: synthetic sequence

<400> SEQUENCE: 45

Ala Asp Leu Asn Met His Arg Ser Trp Tyr Leu Lys
1               5                   10

<210> SEQ ID NO 46
<211> LENGTH: 12
<212> TYPE: PRT
<213> ORGANISM: Artificial sequence
<220> FEATURE:
<223> OTHER INFORMATION: synthetic sequence

<400> SEQUENCE: 46

Ala Thr Phe Thr Ser Tyr Arg Ser Trp Tyr Ser Lys
1               5                   10

<210> SEQ ID NO 47
<211> LENGTH: 12
<212> TYPE: PRT
<213> ORGANISM: Artificial sequence
<220> FEATURE:
<223> OTHER INFORMATION: synthetic sequence

<400> SEQUENCE: 47

Ala Asp Leu Asn Met His Arg Ser Trp Tyr Leu Thr
1               5                   10

<210> SEQ ID NO 48
<211> LENGTH: 12
<212> TYPE: PRT
<213> ORGANISM: Artificial sequence
<220> FEATURE:
<223> OTHER INFORMATION: synthetic sequence

<400> SEQUENCE: 48

Ala Thr Phe Thr Ser Tyr Arg Ser Trp Tyr Leu Lys
1               5                   10

<210> SEQ ID NO 49
<211> LENGTH: 12
<212> TYPE: PRT
<213> ORGANISM: Artificial sequence
<220> FEATURE:
<223> OTHER INFORMATION: synthetic sequence

<400> SEQUENCE: 49

Ala Arg Ile Gln Ser Tyr Arg Ser Trp Tyr Leu Thr
1               5                   10

<210> SEQ ID NO 50
<211> LENGTH: 12
<212> TYPE: PRT
<213> ORGANISM: Artificial sequence
<220> FEATURE:
<223> OTHER INFORMATION: synthetic sequence

<400> SEQUENCE: 50

Ala Asp Leu Asn Met His Arg Ser Trp Tyr Ser Lys
1               5                   10

<210> SEQ ID NO 51
<211> LENGTH: 12
<212> TYPE: PRT
<213> ORGANISM: Artificial sequence
<220> FEATURE:
```

<223> OTHER INFORMATION: synthetic sequence

<400> SEQUENCE: 51

Ala Thr Phe Thr Ser Tyr Arg Ser Trp Tyr Leu Thr
1               5                   10

<210> SEQ ID NO 52
<211> LENGTH: 12
<212> TYPE: PRT
<213> ORGANISM: Artificial sequence
<220> FEATURE:
<223> OTHER INFORMATION: synthetic sequence

<400> SEQUENCE: 52

Ala Arg Ile Gln Ser Tyr Arg Ser Trp Tyr Leu Lys
1               5                   10

<210> SEQ ID NO 53
<211> LENGTH: 12
<212> TYPE: PRT
<213> ORGANISM: Artificial sequence
<220> FEATURE:
<223> OTHER INFORMATION: synthetic sequence

<400> SEQUENCE: 53

Ala Asn Tyr Gly Lys Ala Arg Ser Trp Tyr Leu Lys
1               5                   10

<210> SEQ ID NO 54
<211> LENGTH: 12
<212> TYPE: PRT
<213> ORGANISM: Artificial sequence
<220> FEATURE:
<223> OTHER INFORMATION: synthetic sequence

<400> SEQUENCE: 54

Ala Arg Asp Thr Ser Glu Ser Ser Ser Phe Leu Lys
1               5                   10

<210> SEQ ID NO 55
<211> LENGTH: 12
<212> TYPE: PRT
<213> ORGANISM: Artificial sequence
<220> FEATURE:
<223> OTHER INFORMATION: synthetic sequence

<400> SEQUENCE: 55

Ala Phe Gln Asp Ser Tyr Arg Asn Leu Thr Leu Lys
1               5                   10

<210> SEQ ID NO 56
<211> LENGTH: 12
<212> TYPE: PRT
<213> ORGANISM: Artificial sequence
<220> FEATURE:
<223> OTHER INFORMATION: synthetic sequence

<400> SEQUENCE: 56

Ile Asp Arg His Met Tyr His Ser Leu Tyr Leu Lys
1               5                   10

<210> SEQ ID NO 57
<211> LENGTH: 12
<212> TYPE: PRT
<213> ORGANISM: Artificial sequence
<220> FEATURE:
<223> OTHER INFORMATION: synthetic sequence

<400> SEQUENCE: 57

Ala Glu Leu Gln Ser Leu Glu Gln Ser His Leu Lys
1               5                   10

<210> SEQ ID NO 58
<211> LENGTH: 12
<212> TYPE: PRT
<213> ORGANISM: Artificial sequence
<220> FEATURE:
<223> OTHER INFORMATION: synthetic sequence

<400> SEQUENCE: 58

Ala Asp Leu Gln Asp Thr Ala Ser Leu Thr Leu Lys
1               5                   10

<210> SEQ ID NO 59
<211> LENGTH: 12
<212> TYPE: PRT
<213> ORGANISM: Artificial sequence
<220> FEATURE:
<223> OTHER INFORMATION: synthetic sequence

<400> SEQUENCE: 59

Ala Lys Leu Gln Asp Phe His Gln Trp Tyr Leu Ala
1               5                   10

<210> SEQ ID NO 60
<211> LENGTH: 12
<212> TYPE: PRT
<213> ORGANISM: Artificial sequence
<220> FEATURE:
<223> OTHER INFORMATION: synthetic sequence

<400> SEQUENCE: 60

Ala Arg Ile Gln Asn Arg Arg Trp Gln Arg Leu Thr
1               5                   10

<210> SEQ ID NO 61
<211> LENGTH: 12
<212> TYPE: PRT
<213> ORGANISM: Artificial sequence
<220> FEATURE:
<223> OTHER INFORMATION: synthetic sequence

<400> SEQUENCE: 61

Ala Asp Ile Thr Asp Gly Asn Ser Glu His Leu Lys
1               5                   10

<210> SEQ ID NO 62
<211> LENGTH: 12
<212> TYPE: PRT
<213> ORGANISM: Artificial sequence
<220> FEATURE:
<223> OTHER INFORMATION: synthetic sequence

<400> SEQUENCE: 62

Asp Lys Gly Gln Gln Tyr Arg Asn Trp Phe Leu Lys
1               5                   10

<210> SEQ ID NO 63
<211> LENGTH: 12
<212> TYPE: PRT
<213> ORGANISM: Artificial sequence
<220> FEATURE:
<223> OTHER INFORMATION: synthetic sequence

```
<400> SEQUENCE: 63

Ala Met Thr Thr Gln Ala Arg Ser Ser Tyr Leu Ala
1               5                   10

<210> SEQ ID NO 64
<211> LENGTH: 12
<212> TYPE: PRT
<213> ORGANISM: Artificial sequence
<220> FEATURE:
<223> OTHER INFORMATION: synthetic sequence

<400> SEQUENCE: 64

Arg Arg Pro Gln Arg His Arg Ser Trp His Leu Ala
1               5                   10

<210> SEQ ID NO 65
<211> LENGTH: 12
<212> TYPE: PRT
<213> ORGANISM: Artificial sequence
<220> FEATURE:
<223> OTHER INFORMATION: synthetic sequence

<400> SEQUENCE: 65

Ala Thr Ile Ala Glu Arg Arg Asn Leu Val Leu Lys
1               5                   10

<210> SEQ ID NO 66
<211> LENGTH: 12
<212> TYPE: PRT
<213> ORGANISM: Artificial sequence
<220> FEATURE:
<223> OTHER INFORMATION: synthetic sequence

<400> SEQUENCE: 66

Ala Glu Met Thr Ser Lys His Gln Glu Tyr Leu Lys
1               5                   10

<210> SEQ ID NO 67
<211> LENGTH: 12
<212> TYPE: PRT
<213> ORGANISM: Artificial sequence
<220> FEATURE:
<223> OTHER INFORMATION: synthetic sequence

<400> SEQUENCE: 67

His Leu Ile Asp Gln Tyr Asp Ser Leu Tyr Ser Lys
1               5                   10

<210> SEQ ID NO 68
<211> LENGTH: 12
<212> TYPE: PRT
<213> ORGANISM: Artificial sequence
<220> FEATURE:
<223> OTHER INFORMATION: synthetic sequence

<400> SEQUENCE: 68

Leu Ile Ile Lys Ser Tyr Arg Lys Tyr His Ser Lys
1               5                   10

<210> SEQ ID NO 69
<211> LENGTH: 12
<212> TYPE: PRT
<213> ORGANISM: Artificial sequence
<220> FEATURE:
<223> OTHER INFORMATION: synthetic sequence

<400> SEQUENCE: 69
```

```
Gly Phe Phe Gln Thr Tyr Asp Thr Glu Tyr Leu Lys
1               5                   10
```

<210> SEQ ID NO 70
<211> LENGTH: 12
<212> TYPE: PRT
<213> ORGANISM: Artificial sequence
<220> FEATURE:
<223> OTHER INFORMATION: synthetic sequence

<400> SEQUENCE: 70

```
Cys Arg Leu Asn Ser Phe Trp Thr Trp Trp Leu Lys
1               5                   10
```

<210> SEQ ID NO 71
<211> LENGTH: 12
<212> TYPE: PRT
<213> ORGANISM: Artificial sequence
<220> FEATURE:
<223> OTHER INFORMATION: synthetic sequence

<400> SEQUENCE: 71

```
Ala Arg Gly Thr Thr Thr Arg Arg Ser Arg Leu Lys
1               5                   10
```

<210> SEQ ID NO 72
<211> LENGTH: 12
<212> TYPE: PRT
<213> ORGANISM: Artificial sequence
<220> FEATURE:
<223> OTHER INFORMATION: synthetic sequence

<400> SEQUENCE: 72

```
Ala Ala Gly Gly Lys Tyr Arg Ser Thr Val Ser Lys
1               5                   10
```

<210> SEQ ID NO 73
<211> LENGTH: 12
<212> TYPE: PRT
<213> ORGANISM: Artificial sequence
<220> FEATURE:
<223> OTHER INFORMATION: synthetic sequence

<400> SEQUENCE: 73

```
Ser Cys Ile Arg Ser Tyr Ser Ser Ile Val Leu Lys
1               5                   10
```

<210> SEQ ID NO 74
<211> LENGTH: 12
<212> TYPE: PRT
<213> ORGANISM: Artificial sequence
<220> FEATURE:
<223> OTHER INFORMATION: synthetic sequence

<400> SEQUENCE: 74

```
Pro Asn Pro Arg Glu Val Glu Ser Trp Tyr Leu Lys
1               5                   10
```

<210> SEQ ID NO 75
<211> LENGTH: 12
<212> TYPE: PRT
<213> ORGANISM: Artificial sequence
<220> FEATURE:
<223> OTHER INFORMATION: synthetic sequence

<400> SEQUENCE: 75

```
Pro Leu Val Thr Asp Glu Asp Ser Trp Tyr Ser Lys
1               5                   10
```

<210> SEQ ID NO 76
<211> LENGTH: 15
<212> TYPE: PRT
<213> ORGANISM: Artificial sequence
<220> FEATURE:
<223> OTHER INFORMATION: synthetic sequence

<400> SEQUENCE: 76

```
Cys Ser Ala Arg Asp Leu Thr Ser Gly Ala Asn Asn Glu Gln Phe
1               5                   10                  15
```

<210> SEQ ID NO 77
<211> LENGTH: 12
<212> TYPE: PRT
<213> ORGANISM: Artificial sequence
<220> FEATURE:
<223> OTHER INFORMATION: synthetic sequence

<400> SEQUENCE: 77

```
Cys Ala Ser Ser His Asn Ser Tyr Glu Gln Tyr Phe
1               5                   10
```

<210> SEQ ID NO 78
<211> LENGTH: 13
<212> TYPE: PRT
<213> ORGANISM: Artificial sequence
<220> FEATURE:
<223> OTHER INFORMATION: synthetic sequence

<400> SEQUENCE: 78

```
Cys Ala Ser Ser Pro Arg Gln Glu Tyr Gly Tyr Thr Phe
1               5                   10
```

<210> SEQ ID NO 79
<211> LENGTH: 19
<212> TYPE: PRT
<213> ORGANISM: Artificial sequence
<220> FEATURE:
<223> OTHER INFORMATION: synthetic sequence

<400> SEQUENCE: 79

```
Cys Ala Ser Thr Gly Ser Tyr Arg Glu Val Gly Val Ala Ala Glu Thr
1               5                   10                  15

Gln Tyr Phe
```

<210> SEQ ID NO 80
<211> LENGTH: 14
<212> TYPE: PRT
<213> ORGANISM: Artificial sequence
<220> FEATURE:
<223> OTHER INFORMATION: synthetic sequence

<400> SEQUENCE: 80

```
Cys Ala Thr Asp Thr Thr Ser Gly Thr Tyr Lys Tyr Ile Phe
1               5                   10
```

<210> SEQ ID NO 81
<211> LENGTH: 14
<212> TYPE: PRT
<213> ORGANISM: Artificial sequence
<220> FEATURE:
<223> OTHER INFORMATION: synthetic sequence

<400> SEQUENCE: 81

```
Cys Ala Leu Thr Leu Gln Asn Arg Asp Asp Lys Ile Leu Phe
1               5                  10

<210> SEQ ID NO 82
<211> LENGTH: 13
<212> TYPE: PRT
<213> ORGANISM: Artificial sequence
<220> FEATURE:
<223> OTHER INFORMATION: synthetic sequence

<400> SEQUENCE: 82

Cys Ala Glu Lys Ala Tyr Gly Asn Asn Arg Leu Ala Phe
1               5                  10

<210> SEQ ID NO 83
<211> LENGTH: 12
<212> TYPE: PRT
<213> ORGANISM: Artificial sequence
<220> FEATURE:
<223> OTHER INFORMATION: synthetic sequence

<400> SEQUENCE: 83

Cys Val Val Leu Pro Gly Tyr Asn Lys Leu Ile Phe
1               5                  10

<210> SEQ ID NO 84
<211> LENGTH: 15
<212> TYPE: PRT
<213> ORGANISM: Artificial sequence
<220> FEATURE:
<223> OTHER INFORMATION: synthetic sequence

<400> SEQUENCE: 84

Glu Asn Pro Val Val His Phe Phe Lys Asn Ile Val Thr Pro Arg
1               5                  10                  15

<210> SEQ ID NO 85
<211> LENGTH: 12
<212> TYPE: PRT
<213> ORGANISM: Artificial sequence
<220> FEATURE:
<223> OTHER INFORMATION: synthetic sequence

<400> SEQUENCE: 85

Cys Gly Thr Ala Ser Asn Thr Gly Lys Leu Ile Phe
1               5                  10

<210> SEQ ID NO 86
<211> LENGTH: 15
<212> TYPE: PRT
<213> ORGANISM: Artificial sequence
<220> FEATURE:
<223> OTHER INFORMATION: synthetic sequence

<400> SEQUENCE: 86

Cys Ile Leu Arg Asp Thr Thr Ser Gly Thr Tyr Lys Tyr Ile Phe
1               5                  10                  15

<210> SEQ ID NO 87
<211> LENGTH: 15
<212> TYPE: PRT
<213> ORGANISM: Artificial sequence
<220> FEATURE:
<223> OTHER INFORMATION: synthetic sequence

<400> SEQUENCE: 87
```

-continued

```
Cys Ala Leu Ser Asp Pro Tyr Thr Gly Arg Arg Ala Pro Thr Phe
1               5                   10                  15

<210> SEQ ID NO 88
<211> LENGTH: 8
<212> TYPE: PRT
<213> ORGANISM: Artificial sequence
<220> FEATURE:
<223> OTHER INFORMATION: synthetic sequence

<400> SEQUENCE: 88

Cys Ala Ile Pro Gly Leu Thr Phe
1               5
```